(12) United States Patent
Nguyen et al.

(10) Patent No.: US 9,696,690 B2
(45) Date of Patent: Jul. 4, 2017

(54) MULTI-SEGMENT WEARABLE ACCESSORY

(75) Inventors: David H. Nguyen, Sunnyvale, CA (US); Kenton M. Lyons, Santa Clara, CA (US)

(73) Assignee: Nokia Technologies Oy, Espoo (FI)

( * ) Notice: Subject to any disclaimer, the term of this patent is extended or adjusted under 35 U.S.C. 154(b) by 758 days.

(21) Appl. No.: 13/589,830

(22) Filed: Aug. 20, 2012

(65) Prior Publication Data

US 2013/0271495 A1     Oct. 17, 2013

Related U.S. Application Data

(60) Provisional application No. 61/624,039, filed on Apr. 13, 2012.

(51) Int. Cl.
    *G06F 3/041*     (2006.01)
    *G06F 1/16*     (2006.01)
    (Continued)

(52) U.S. Cl.
    CPC ........... *G04G 17/083* (2013.01); *G04G 21/02* (2013.01); *G06F 1/163* (2013.01); *G06F 1/1641* (2013.01);
    (Continued)

(58) Field of Classification Search
    CPC .................. G04G 17/045; G06F 1/163; G06F 2203/04102; G06F 3/0485; G06F 3/0486; H04M 1/0268; H04M 2250/12
    (Continued)

(56) References Cited

U.S. PATENT DOCUMENTS 6,590,835 B2    7/2003    Farine et al.
6,809,724 B1    10/2004    Shiraishi et al.
(Continued)

FOREIGN PATENT DOCUMENTS

EP     1 259 135 A1    11/2002
EP     1 754 424 A1    2/2007
(Continued)

OTHER PUBLICATIONS

Lyons, K. et al., *Facet: A Multi-Segment Wrist Worn System*, UIST12, Oct. 7-10, 2012, 7 pages.
(Continued)

*Primary Examiner* — Ulka Chauhan
*Assistant Examiner* — Sae Won Yoon
(74) *Attorney, Agent, or Firm* — Alston & Bird LLP

(57) ABSTRACT

A method, apparatus and computer program product are provided to facilitate the use of a multi-segment wearable accessory. In this regard, methods, apparatus and computer program products are provided for controlling and, in some instances, interacting with a multi-segment wearable accessory. Each screen presented on or capable of being presented on the display of a segment of the multi-segment wearable accessory may be considered a virtual segment, and the number of virtual segments may be greater than the number of physical segments of the accessory. One or more of the virtual segments may be associated with one or more of the segments in an overlaid configuration, such that a topmost virtual segment is presented for viewing while another virtual segment lies below the topmost virtual segment, hidden from the user's view. A virtual segment may be replaced with presentation of another virtual segment in response to rotation of the accessory.

20 Claims, 20 Drawing Sheets

(51) Int. Cl.
| | |
|---|---|
| *G04G 17/08* | (2006.01) |
| *G06F 3/14* | (2006.01) |
| *G06F 3/01* | (2006.01) |
| *G06F 3/0485* | (2013.01) |
| *H04M 1/02* | (2006.01) |
| *H04M 1/725* | (2006.01) |
| *G06F 3/0346* | (2013.01) |
| *G06F 3/0488* | (2013.01) |
| *G04G 21/02* | (2010.01) |

(52) U.S. Cl.
   CPC .......... *G06F 1/1647* (2013.01); *G06F 1/1649* (2013.01); *G06F 1/1692* (2013.01); *G06F 1/1694* (2013.01); *G06F 3/017* (2013.01); *G06F 3/0485* (2013.01); *G06F 3/04883* (2013.01); *G06F 3/1423* (2013.01); *G06F 3/1446* (2013.01); *H04M 1/0206* (2013.01); *H04M 1/0247* (2013.01); *H04M 1/7253* (2013.01); *G06F 2200/1637* (2013.01); *G09G 2354/00* (2013.01); *G09G 2356/00* (2013.01); *G09G 2380/02* (2013.01); *H04M 2250/16* (2013.01); *H04M 2250/22* (2013.01)

(58) Field of Classification Search
   USPC ......................................................... 345/649
   See application file for complete search history.

(56) References Cited

U.S. PATENT DOCUMENTS

| | | |
|---|---|---|
| 7,209,114 B2 | 4/2007 | Radley-Smith |
| 7,778,118 B2 | 8/2010 | Lyons et al. |
| 7,844,301 B2 | 11/2010 | Lee et al. |
| 8,312,392 B2 | 11/2012 | Forutanpour et al. |
| 8,537,113 B2 | 9/2013 | Weising et al. |
| 2003/0030595 A1 | 2/2003 | Radley-Smith |
| 2003/0071832 A1 | 4/2003 | Branson |
| 2005/0275667 A1 | 12/2005 | Jeon |
| 2007/0003061 A1 | 1/2007 | Jung et al. |
| 2007/0152963 A1 | 7/2007 | Wong |
| 2008/0189365 A1 | 8/2008 | Narayanaswami et al. |
| 2008/0309640 A1 | 12/2008 | Hong |
| 2008/0318636 A1 | 12/2008 | Kim |
| 2009/0160777 A1 | 6/2009 | Liu et al. |
| 2009/0195497 A1 | 8/2009 | Fitzgerald et al. |
| 2009/0196124 A1 | 8/2009 | Mooring |
| 2009/0209281 A1 | 8/2009 | Suzuki et al. |
| 2009/0251419 A1* | 10/2009 | Radely-Smith ............... 345/169 |
| 2009/0295731 A1 | 12/2009 | Kim et al. |
| 2009/0303208 A1 | 12/2009 | Case et al. |
| 2010/0004037 A1 | 1/2010 | Ozawa |
| 2010/0011291 A1 | 1/2010 | Nurmi |
| 2010/0029327 A1* | 2/2010 | Jee ............................ 455/556.1 |
| 2010/0058205 A1 | 3/2010 | Vakil et al. |
| 2010/0060664 A1 | 3/2010 | Kilpatrick, II et al. |
| 2010/0064244 A1 | 3/2010 | Kilpatrick et al. |
| 2010/0064536 A1 | 3/2010 | Caskey et al. |
| 2010/0079508 A1 | 4/2010 | Hodge et al. |
| 2010/0156676 A1* | 6/2010 | Mooring et al. ................. 341/20 |
| 2010/0182247 A1 | 7/2010 | Petschnigg |
| 2010/0182265 A1 | 7/2010 | Kim et al. |
| 2010/0241973 A1 | 9/2010 | Whiddett |
| 2010/0245209 A1 | 9/2010 | Miller et al. |
| 2010/0283743 A1 | 11/2010 | Coddington |
| 2010/0298032 A1 | 11/2010 | Lee et al. |
| 2010/0302179 A1 | 12/2010 | Ahn et al. |
| 2011/0014956 A1* | 1/2011 | Lee et al. ................... 455/569.1 |
| 2011/0088002 A1 | 4/2011 | Freer |
| 2011/0090155 A1 | 4/2011 | Caskey et al. |
| 2011/0163969 A1 | 7/2011 | Ansures et al. |
| 2011/0187505 A1 | 8/2011 | Faith et al. |
| 2011/0187681 A1* | 8/2011 | Kim et al. .................... 345/204 |
| 2011/0193805 A1 | 8/2011 | Park et al. |
| 2011/0209101 A1 | 8/2011 | Hinckley et al. |
| 2011/0209102 A1 | 8/2011 | Hinckley et al. |
| 2011/0216064 A1 | 9/2011 | Dahl et al. |
| 2011/0231783 A1 | 9/2011 | Nomura |
| 2011/0299235 A1 | 12/2011 | Liu et al. |
| 2012/0075236 A1 | 3/2012 | Kim et al. |
| 2012/0084675 A1 | 4/2012 | Sirpal et al. |
| 2012/0084738 A1 | 4/2012 | Sirpal |
| 2012/0092332 A1 | 4/2012 | Tsukahara et al. |
| 2012/0133790 A1 | 5/2012 | Sams |
| 2012/0139939 A1 | 6/2012 | Russ et al. |
| 2012/0154293 A1 | 6/2012 | Hinckley et al. |
| 2012/0206391 A1 | 8/2012 | Kim et al. |
| 2012/0319943 A1 | 12/2012 | Tamura |
| 2013/0080143 A1 | 3/2013 | Reeves et al. |
| 2013/0080933 A1 | 3/2013 | Reeves et al. |
| 2013/0082585 A1 | 4/2013 | Becze et al. |
| 2013/0084805 A1 | 4/2013 | Pasquero et al. |
| 2013/0169580 A1 | 7/2013 | Tomimori |
| 2013/0222207 A1 | 8/2013 | Baek |
| 2013/0222270 A1 | 8/2013 | Winkler et al. |
| 2013/0222271 A1 | 8/2013 | Alberth et al. |
| 2013/0222272 A1 | 8/2013 | Martin, Jr. |
| 2013/0238712 A1 | 9/2013 | Dearman |
| 2013/0321340 A1 | 12/2013 | Seo et al. |
| 2014/0210737 A1 | 7/2014 | Hwang et al. |

FOREIGN PATENT DOCUMENTS

| | | |
|---|---|---|
| EP | 2 048 861 A1 | 4/2009 |
| EP | 2 129 084 A1 | 12/2009 |
| EP | 2 150 031 A1 | 2/2010 |
| EP | 2 159 676 A1 | 3/2010 |
| EP | 2 357 548 A2 | 8/2011 |
| EP | 2 426 597 A1 | 3/2012 |
| GB | 2 388 765 A | 11/2003 |
| GB | 2 411 552 A | 8/2005 |
| JP | 2002/132410 A | 5/2002 |
| JP | 2009/116274 A | 5/2009 |
| WO | WO 01/64070 A1 | 9/2001 |
| WO | WO-2006/120211 A1 | 11/2006 |
| WO | WO 2007/069116 A2 | 6/2007 |
| WO | WO 2010/097692 A1 | 9/2010 |
| WO | WO 2011/047338 A1 | 4/2011 |
| WO | WO 2011/077384 A1 | 6/2011 |
| WO | WO 2011/103317 A1 | 8/2011 |
| WO | WO 2011/106467 A2 | 9/2011 |
| WO | WO 2012/044774 A1 | 4/2012 |
| WO | WO 2012/044777 A1 | 4/2012 |

OTHER PUBLICATIONS

"Rollerphone Bracelet Phone is Actually a Wrist Band with a Flexible Display"; Downloaded from http://www.concept-phones.com/cool-concepts/rollerphone-bracelet-phone-wrist-band-flexible-display/ on Sep. 27, 2012; 6 pages.

"Glove One Prototype Wearable Phone Looks Like Iron Man's Glove"; Downloaded from http://www.concept-phones.com/?s=wearable+phone on Sep. 27, 2012; 26 pages.

Matsumoto, T., et al.; "Z-agon: mobile multi-display browser cube;" Conference of Himan Factos in Computing Systems; dated Apr. 2006; originally retrieved from <http://dl.acm.org/citation.cfm?id=1125528>; abstract retrieved on Sep. 13, 2013 from <https://www.researchgate.net/publication/221514438_Z-agon_mobile_multi-display_browser_cube?ev=srch_pub>.

"*Lumiloop Wearable LED Display;*" igargoyle: Wearable Computing Archives; p. 56 dated Nov. 7, 2005; retrieved on Sep. 13, 2013 from <http://igargoyle.com/archives/wearable_computing/>.

International Search Report and Written Opinion for Application No. PCT/FI2013/050372; dated Sep. 5, 2013.

International Search Report and Written Opinion for Application No. PCT/FI2013/050364 dated Aug. 7, 2013.

International Search Report and Written Opinion for Application No. PCT/FI2013/050373; dated Sep. 19, 2013.

International Search Report and Written Opinion for Application No. PCT/FI2013/050374; dated Aug. 5, 2013.

(56) References Cited

OTHER PUBLICATIONS

International Search Report and Written Opinion for Application No. PCT/FI2013/050368; dated Aug. 29, 2013.
International Search Report and Written Opinion for Application No. PCT/FI2013/050371, dated Aug. 5, 2013.
International Search Report and Written Opinion for Application No. PCT/FI2013/050369, dated Aug. 7, 2013.
Sprint Dual-Screen Echo Android Phone to Tackle Apple iPhone 4—Mobile and Wireless . . . [online] [retrieved Jan. 11, 2013]. Retreived from theIinternet: <URL:.http://www.eweek.com/c/a/Mobile-and-Wireless/Sprint-DualScreen-Echo-Android-Phone-to-Tackle-Apple-iPhone-4-570942/>. (dated Feb. 8, 2011) 10 pages.
Bieber, G. et al., *Ambient Interaction by Smart Watches*, PETRA2012, Jun. 6-8, 2012, 6 pages.
igargoyle: Wearable Computing Archives, Sep. 29, 2010, [online] [retrieved Sep. 27, 2012]. Retrieved from the Internet: <URL: http://igargoyle.com/archives/wearable_computing/>. 71 pages.
Touch Screen Bracelet Tells You the Weather and Reads Texts [Pics]—PSFK (undated), [online] [retrieved Sep. 14, 2012]. Retrieved from the Internet: <URL: http://www.psfk.com/2012/03/touch-screen-bracelet-text.html>. 3 pages.
"Mobile Multi Display system by UMIC-RWTH of Aachen University," dated Feb. 22, 2011, date accessed: Sep. 28, 2012; <http://armdevices.net/2011/02/22/mobile-multi-display-system-by-umic-rwth-of-aachen-university/>.
"Configuring Multiple Displays with Windows 7 and Windows Vista Operating Systems;" dated Sep. 15, 2011; date accessed Oct. 1, 2012 http://smarttech.com/kb/142575.
Nacenta et al.; Perspective Cursor: Perspective-Based Interaction for Multi-Display Environments; date accessed Oct. 1, 2012; http://hci.usask.ca/publications/2006/pcursor.pdf.
Thrystan; "Rollerphone Bracelet Phone is Actually a Wrist Band with a Flexible Display;" Concept Phones; dated Mar. 21, 2011; retrieved Nov. 1, 2012; http://www.concept-phones.com/cool-concepts/rollerphone-bracelet-phone-wrist-band-flexible-display/.
Office Action for U.S. Appl. No. 13/550,302 mailed May 23, 2014.
Office Action for U.S. Appl. No. 13/604,670 mailed Feb. 6, 2014.
Notice of Allowance for U.S. Appl. No. 13/604,670 mailed Jun. 26, 2014.
Office Action for U.S. Appl. No. 13/595,500 mailed Mar. 31, 2014.
Office Action for U.S. Appl. No. 13/591,679 mailed Feb. 7, 2014.
Office Action for U.S. Appl. No. 13/586,314 mailed Apr. 11, 2014.
Office Action for U.S. Appl. No. 13/624,300 mailed Mar. 11, 2014.
Office Action for U.S. Appl. No. 13/586,314 mailed Apr. 9, 2015.
Notice of Allowance for U.S. Appl. No. 13/586,314 mailed Apr. 29, 2015.
Office Action for U.S. Appl. No. 13/595,500 dated Jun. 30, 2015.
Office Action for U.S. Appl. No. 13/624,300 mailed Dec. 19, 2014.
Office Action for U.S. Appl. No. 13/591,679 mailed Dec. 29, 2014.
Office Action for U.S. Appl. No. 13/624,300 dated Jun. 8, 2015.
Office Action for U.S. Appl. No. 13/595,500 dated Jan. 25, 2016.
Office Action for U.S. Appl. No. 13/595,500 mailed Oct. 24, 2014.
Office Action for U.S. Appl. No. 13/595,500 dated Apr. 15, 2016, 14 pages.
Examiner's Answer for U.S. Appl. No. 13/591,679 dated Feb. 12, 2016.
Office Action for U.S. Appl. No. 13/624,300 dated Dec. 10, 2015.
Office Action for U.S. Appl. No. 13/595,500 dated Dec. 2, 2016.

\* cited by examiner

MULTI-SEGMENT WEARABLE ACCESSORY

CROSS-REFERENCE TO RELATED APPLICATIONS

This application claims the benefit of U.S. Provisional Application No. 61/624,039 entitled "Multi-Segment Wearable Accessory," filed Apr. 13, 2012, the contents of which are incorporated herein in their entirety.

TECHNOLOGICAL FIELD

An example embodiment of the present invention relates generally to a multi-segment wearable accessory and, more particularly, to methods, apparatus and computer program products for controlling and, in some embodiments, interacting with a multi-segment wearable accessory.

BACKGROUND

Mobile terminals, such as mobile telephones, personal digital assistants (PDAs), gaming devices, music players or the like, are widely utilized in order to provide many different functions. For example, mobile terminals may be commonly utilized in order to establish voice calls, to exchange email communications, text messages or instant messages, to play various forms of media, to browse the Internet, to play games, etc. While mobile terminals are capable of providing a wide variety of functionality, the user may regularly utilize only a subset of the functions supported by the mobile terminal with the particular functions that are utilized depending upon the context of the user. For example, a user who carries a mobile terminal while going out with friends may utilize the telephone and messaging functionality, but may not utilize the gaming or media playing functionality.

Even though the user may utilize only a subset of the functionality provided by a mobile terminal depending upon their context, a user may carry a mobile terminal at virtually all times. Thus, the user must keep track of the mobile terminal and must safeguard the mobile terminal from damage due to impact, exposure to water or the like. In some instances, users may carry two or more mobile terminals, such as a personal cellular telephone, a PDA utilized for work and a gaming device. In these instances, a user must keep track of even more mobile terminals which may, in some instances, be distracting or at least somewhat time-consuming for the user.

BRIEF SUMMARY

A method, apparatus and computer program product are provided in accordance with an example embodiment for facilitating the use of a multi-segment wearable accessory. The multi-segment wearable accessory may be configured to provide various types of functionality and may be worn by the user so as to reduce the number of independent mobile terminals that the user must otherwise carry. In one embodiment, the method, apparatus and computer program product may facilitate the interaction of the plurality of segments of a multi-segment wearable accessory. Additionally or alternatively, the multi-segment wearable accessory may be tailored in one embodiment such that the segments are appropriate for the context of the user.

In one embodiment, a method is provided that includes associating first content with a segment of a multi-segment wearable accessory and associating second content with the segment of the multi-segment wearable accessory. Each of the first and second content represents a virtual segment. The method of this embodiment also includes causing one or more virtual segments to be presented on a display of the segment. In response to rotation of the multi-segment wearable accessory, the method of this embodiment determines whether to replace the virtual segment being presented with presentation of the other virtual segment. In one embodiment, the method may also, in response to rotation of the multi-segment wearable accessory, determine whether to power down the display of the segment.

The determination as to whether to replace the virtual segment being presented with the presentation of the other virtual segment may be based at least partially on a location of the display of the segment with respect to the user's line of sight. For example, the virtual segment that is caused to be presented may be replaced with the presentation of the other virtual segment in an instance in which the display of the segment is outside the user's line of sight with respect to displays of other segments of the multi-segment wearable accessory. The method of one embodiment may also associate additional virtual segment with additional segments of the multi-segment wearable accessory such that the total number of virtual segments of the multi-segment wearable accessory is greater than the total number of segments of the multi-segment wearable accessory. Each virtual segment being presented on a display of a respective segment may be sequentially replaced in accordance with this embodiment with the presentation of another virtual segment associated with the respective segment. In this embodiment, the virtual segments being presented on displays of adjacent segments may provide a user with continuous scrolling of content.

In another embodiment, an apparatus is provided that includes at least one processor and at least one memory including computer program code with the at least one memory and the computer program code configured to, with the processor, cause the apparatus to at least associate first content with a segment of a multi-segment wearable accessory and associate second content with the segment of the multi-segment wearable accessory. Each of the first and second content represents a virtual segment. The at least one memory and the computer program code are also configured to, with the processor, cause the apparatus to cause one of the virtual segments to be presented on a display of the segment. In response to rotation of the multi-segment wearable accessory, the at least one memory and the computer program code are also configured to, with the processor, cause the apparatus to determine whether to replace the virtual segment being presented with presentation of the other virtual segment. In one embodiment, the at least one memory and the computer program code may also be configured to, with the processor, cause the apparatus to determine, in response to rotation of the multi-segment wearable accessory, whether to power down the display of the segment.

The determination as to whether to replace the virtual segment being presented with the presentation of the other virtual segment may be based at least partially on a location of the display of the segment with respect to the user's line of sight. For example, the virtual segment that is caused to be presented may be replaced with the presentation of the other virtual segment in an instance in which the display of the segment is outside the user's line of sight with respect to displays of other segments of the multi-segment wearable accessory. In one embodiment, the at least one memory and the computer program code may also be configured to, with the processor, cause the apparatus to detect rotation of the multi-segment wearable accessory via an inertial measurement unit (IMU). The at least one memory and the computer program code may also be configured to, with the processor, cause the apparatus to associate additional virtual segment with additional segments of the multi-segment wearable accessory such that the total number of virtual segments of the multi-segment wearable accessory is greater than the total number of segments of the multi-segment wearable accessory. Each virtual segment being presented on a display of a respective segment may be sequentially replaced in accordance with this embodiment with the presentation of another virtual segment associated with the respective segment. In this embodiment, the virtual segments being presented on displays of adjacent segments may provide a user with continuous scrolling of content.

In a further embodiment, a computer program product is provided that includes at least one non-transitory computer-readable storage medium having computer-executable program code portions stored therein with the computer-executable program code portions including program code instructions configured to associate first content with a segment of a multi-segment wearable accessory and to associate second content with the segment of the multi-segment wearable accessory. Each of the first and second content represents a virtual segment. The computer-executable program code portions of this embodiment may also include program code instructions configured to cause one or more virtual segments to be presented on a display of the segment. In response to rotation of the multi-segment wearable accessory, the computer-executable program code portions include program code instructions configured to determine whether to replace the virtual segment being presented with presentation of the other virtual segment. In one embodiment, the computer-executable program code portions also include program code instructions configured, in response to rotation of the multi-segment wearable accessory, determine whether to power down the display of the segment.

The determination as to whether to replace the virtual segment being presented with the presentation of the other virtual segment may be based at least partially on a location of the display of the segment with respect to the user's line of sight. For example, the virtual segment that is caused to be presented may be replaced with the presentation of the other virtual segment in an instance in which the display of the segment is outside the user's line of sight with respect to displays of other segments of the multi-segment wearable accessory. The computer-executable program code portions of one embodiment also include program code instructions configured to associate additional virtual segment with additional segments of the multi-segment wearable accessory such that the total number of virtual segments of the multi-segment wearable accessory is greater than the total number of segments of the multi-segment wearable accessory. Each virtual segment being presented on a display of a respective segment may be sequentially replaced in accordance with this embodiment with the presentation of another virtual segment associated with the respective segment. In this embodiment, the virtual segments being presented on displays of adjacent segments may provide a user with continuous scrolling of content.

In yet another embodiment, an apparatus is provided that includes means for associating first content with a segment of a multi-segment wearable accessory and means for associating second content with the segment of the multi-segment wearable accessory. Each of the first and second content represents a virtual segment. The apparatus of this embodiment also includes means for causing one of the virtual segments to be presented on a display of the segment. In response to rotation of the multi-segment wearable accessory, the apparatus of this embodiment also includes means for determining whether to replace the virtual segment being presented with presentation of the other virtual segment.

BRIEF DESCRIPTION OF THE SEVERAL VIEWS OF THE DRAWINGS

Figure 1:
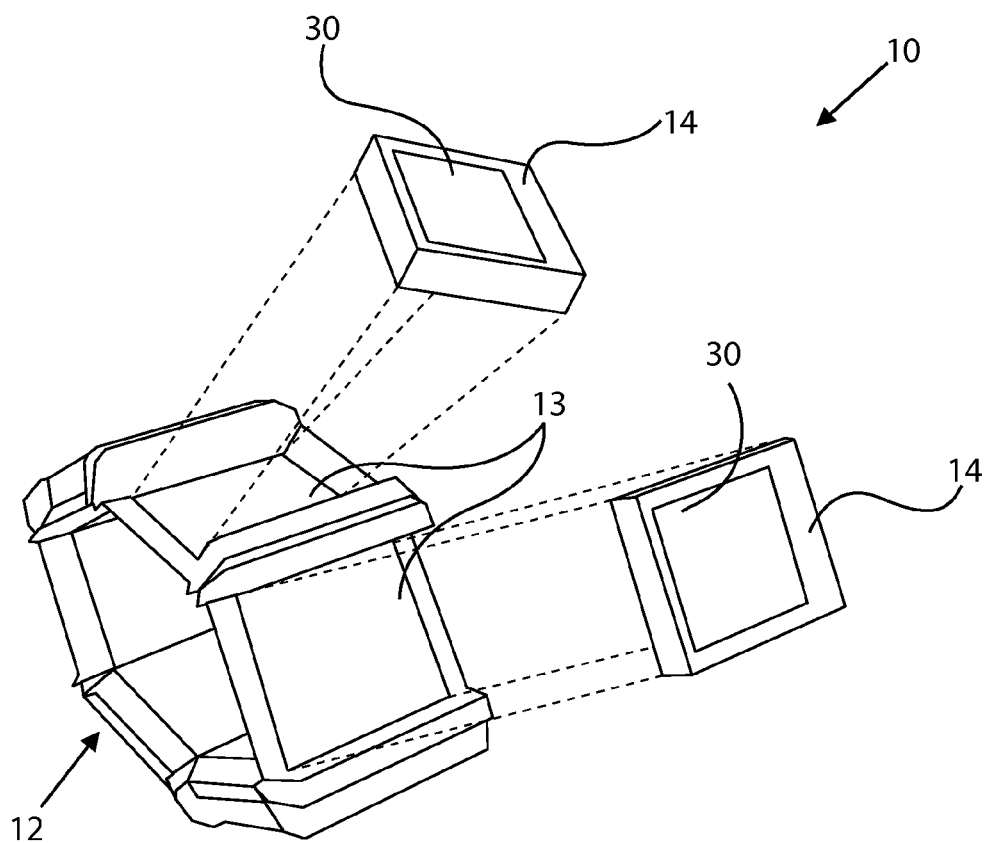
Figure 2:
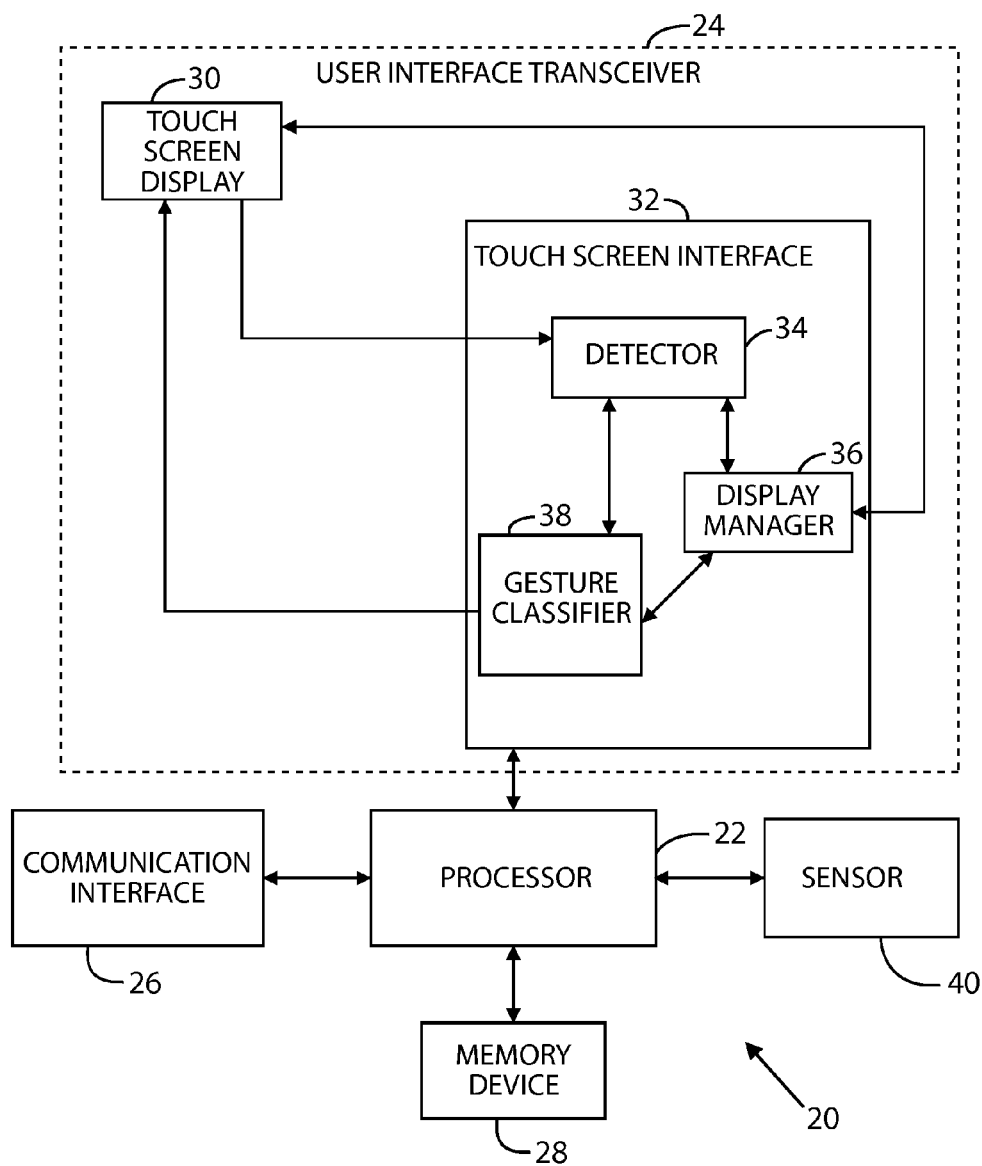
Figure 3:
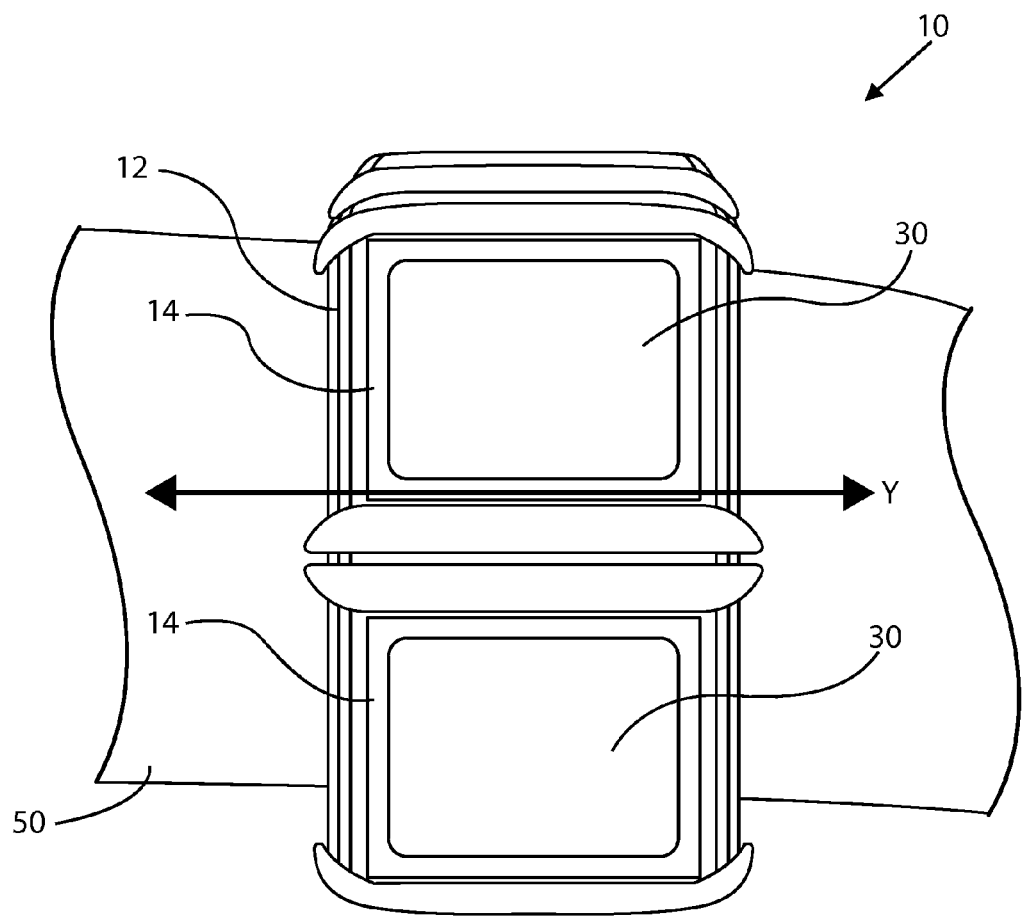
Figure 4:
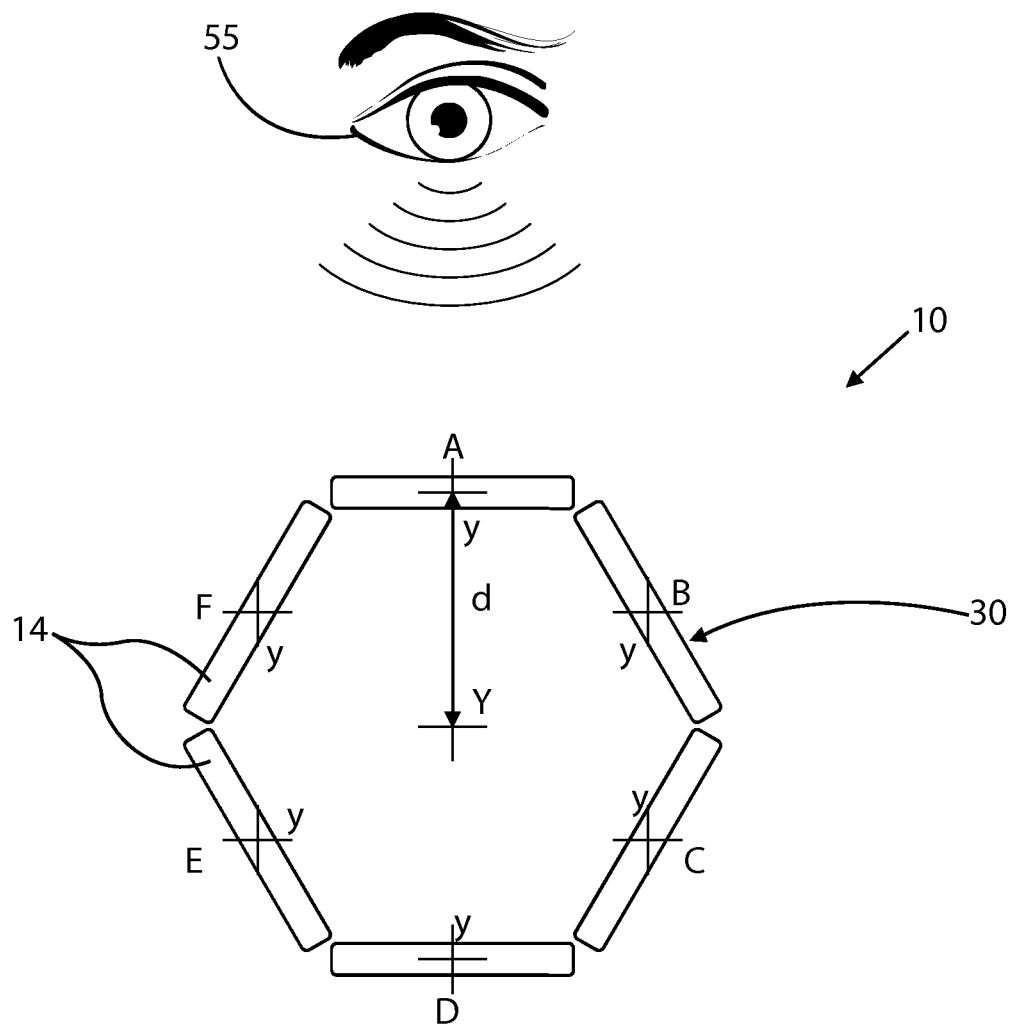
Figure 5:
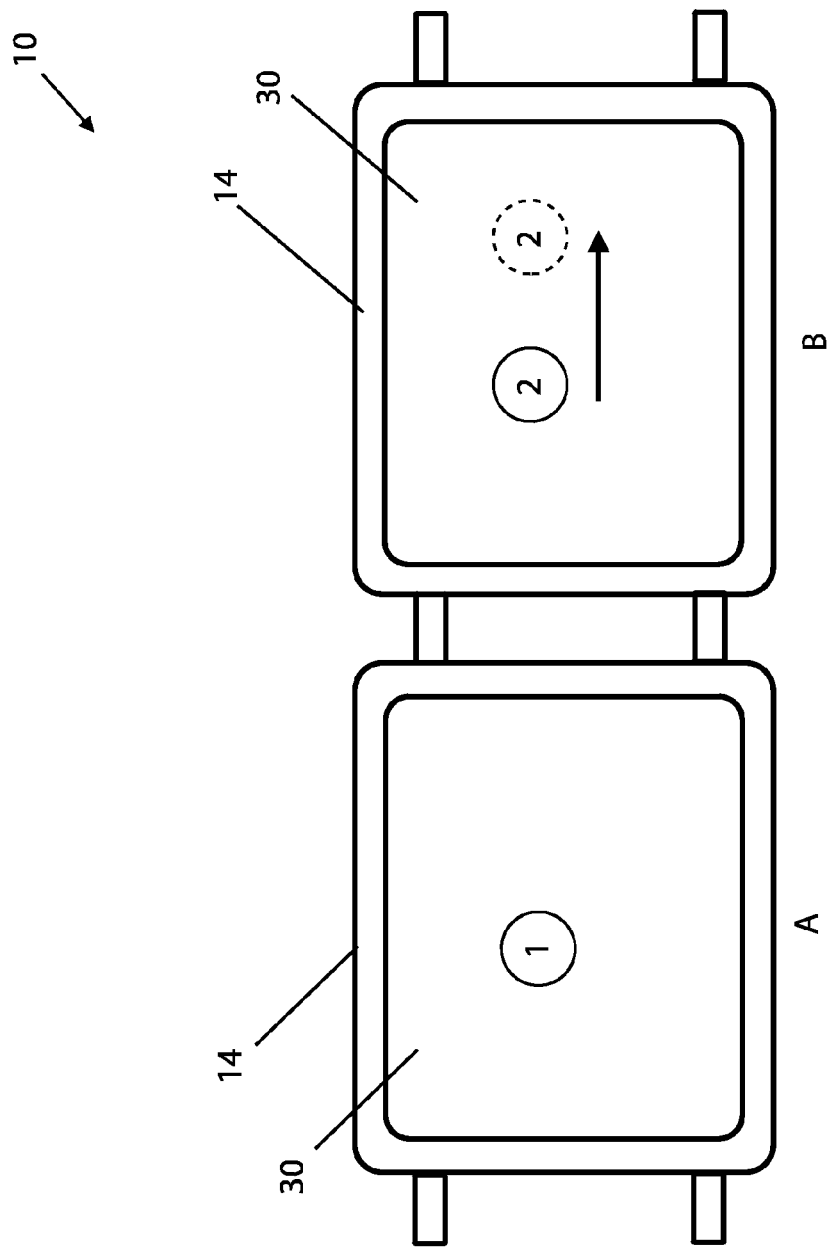
Figure 5A:
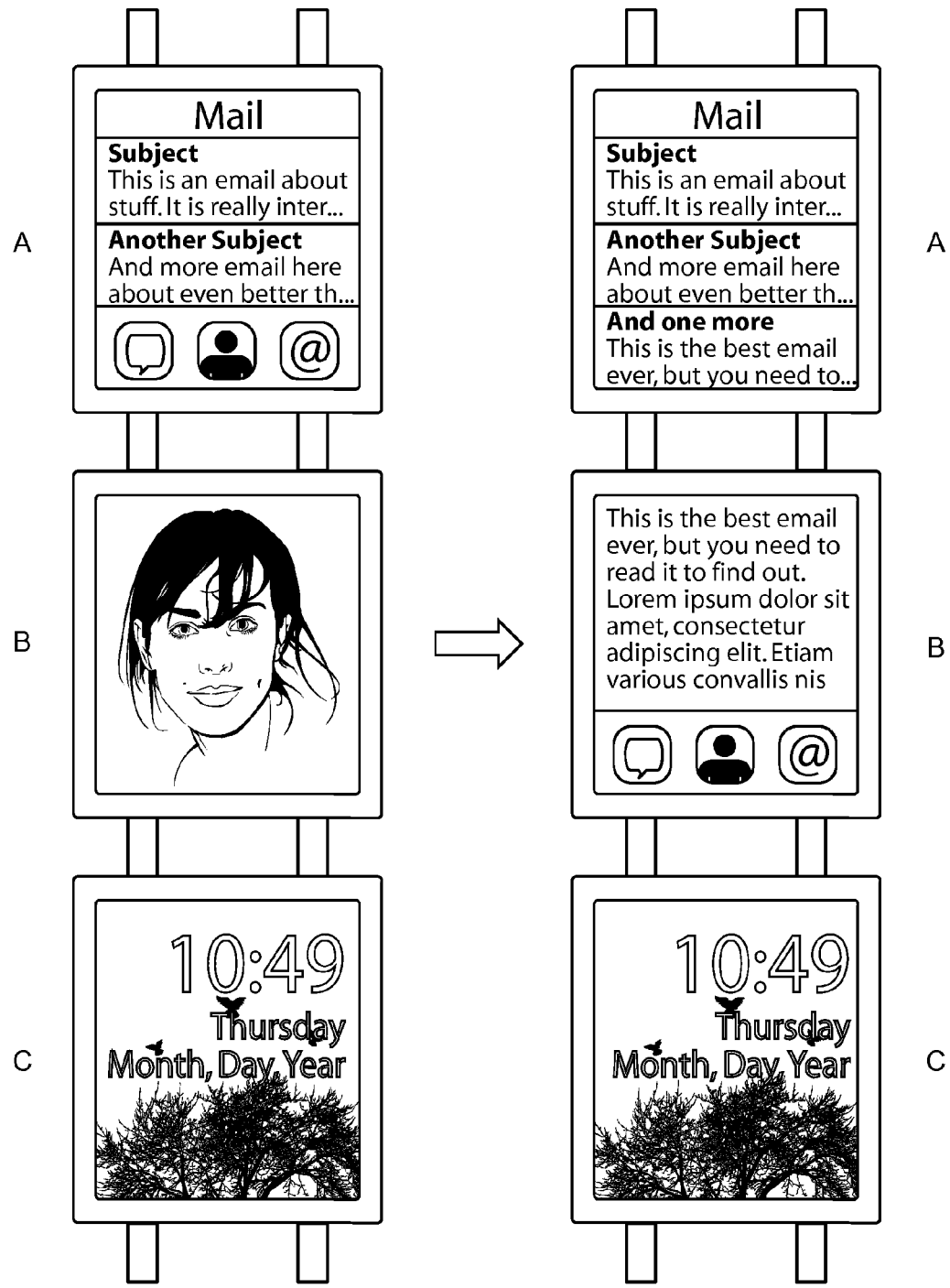
Figure 5B:
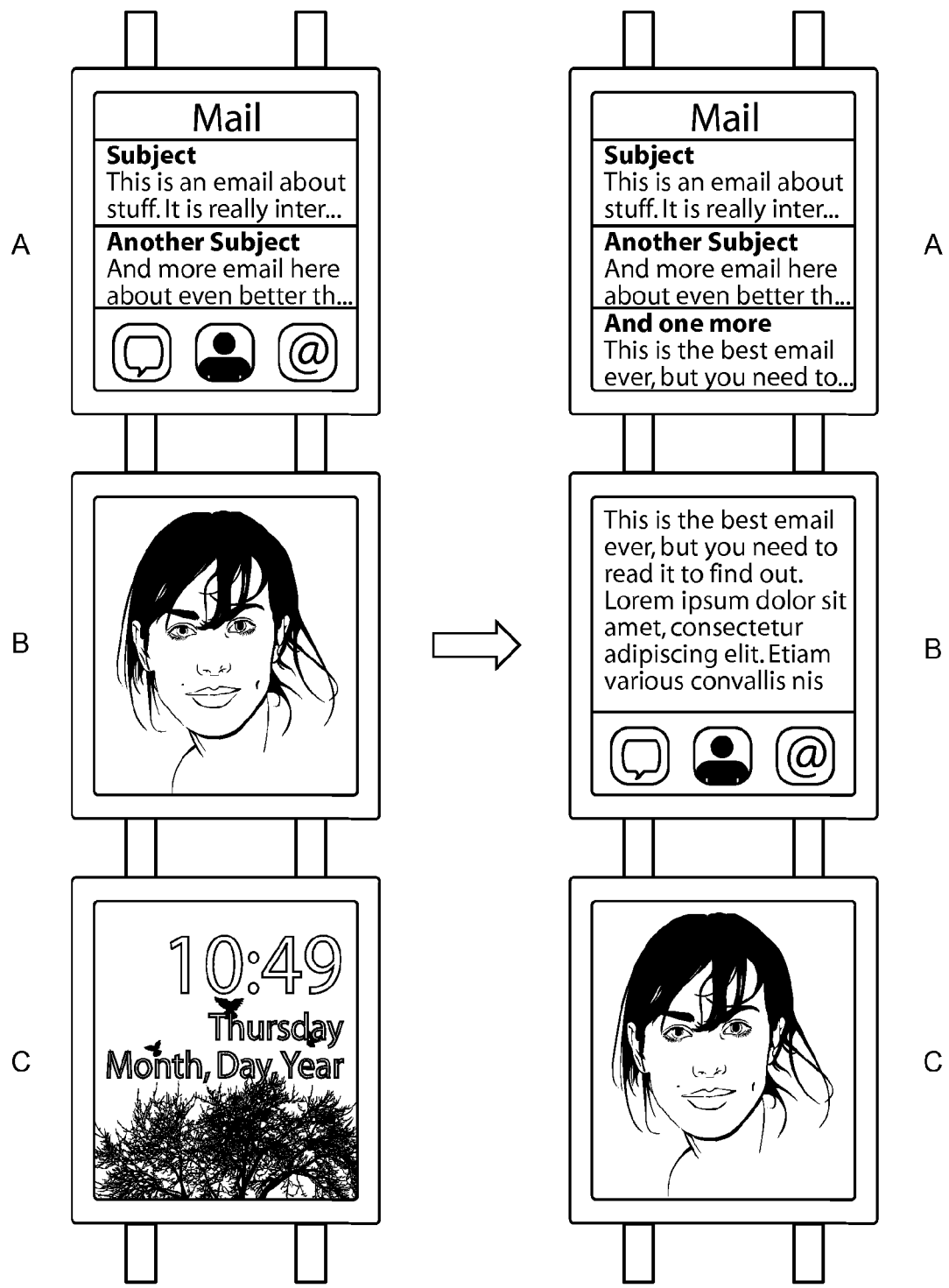
Figure 6:
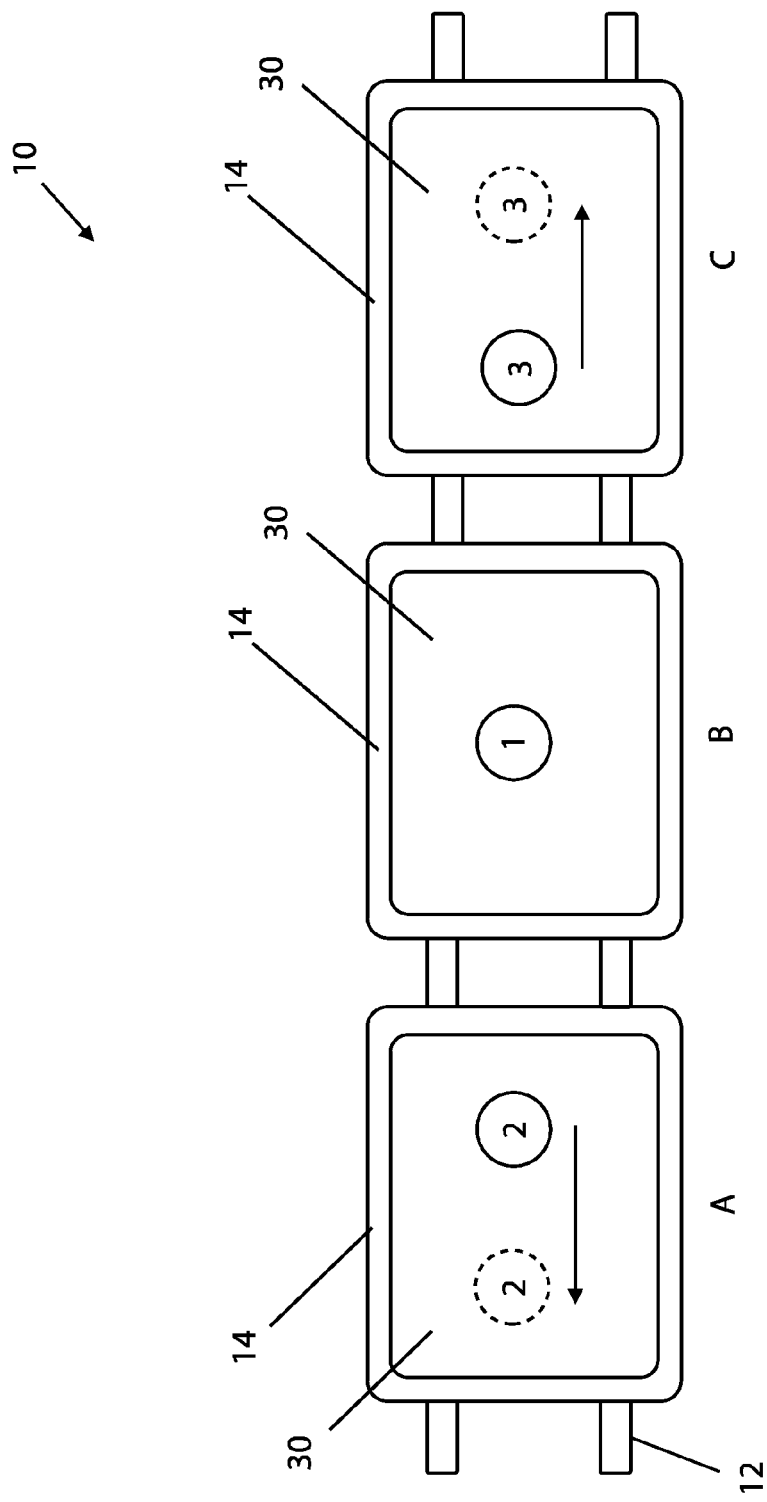
Figure 6A:
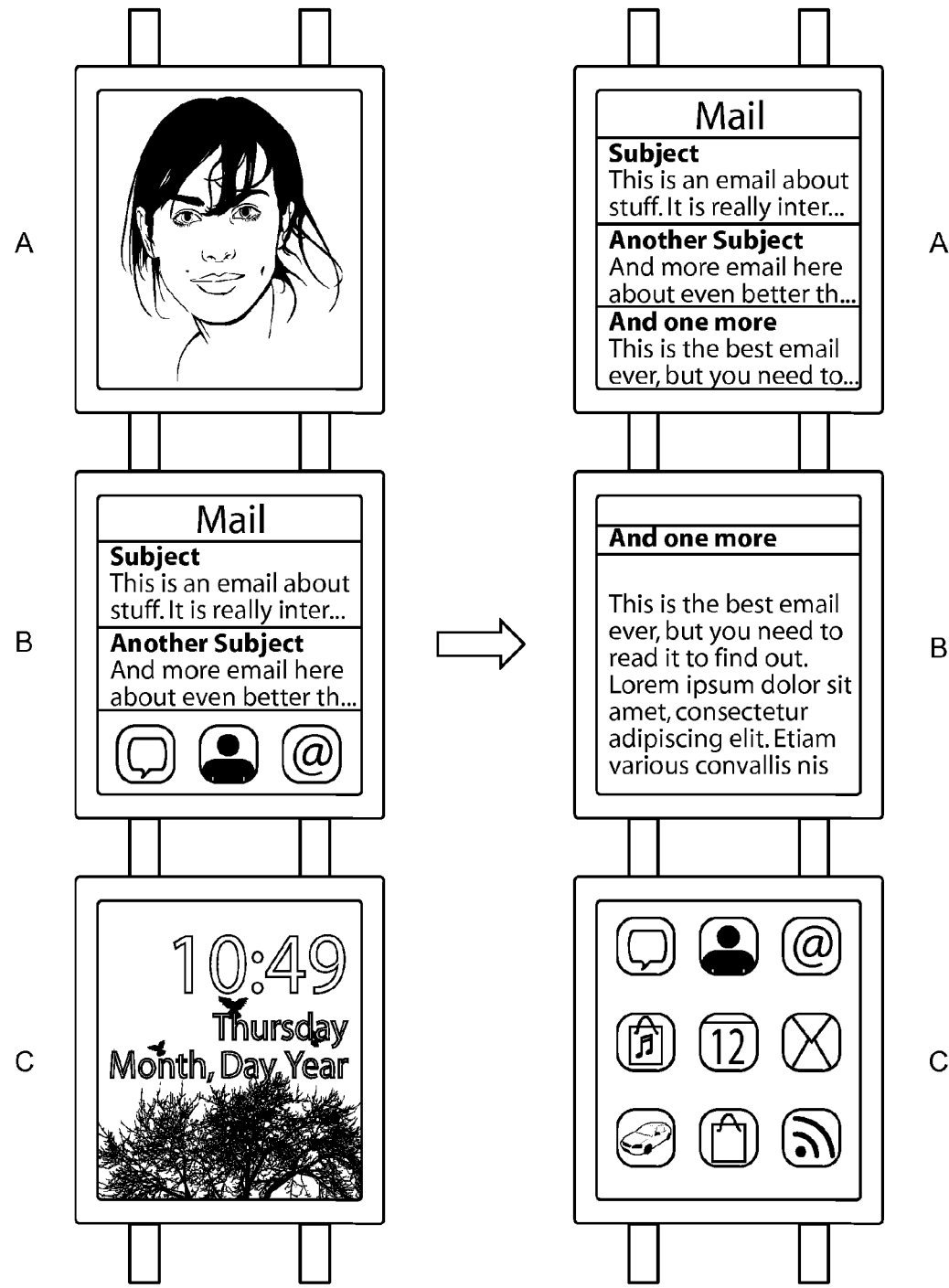
Figure 7:
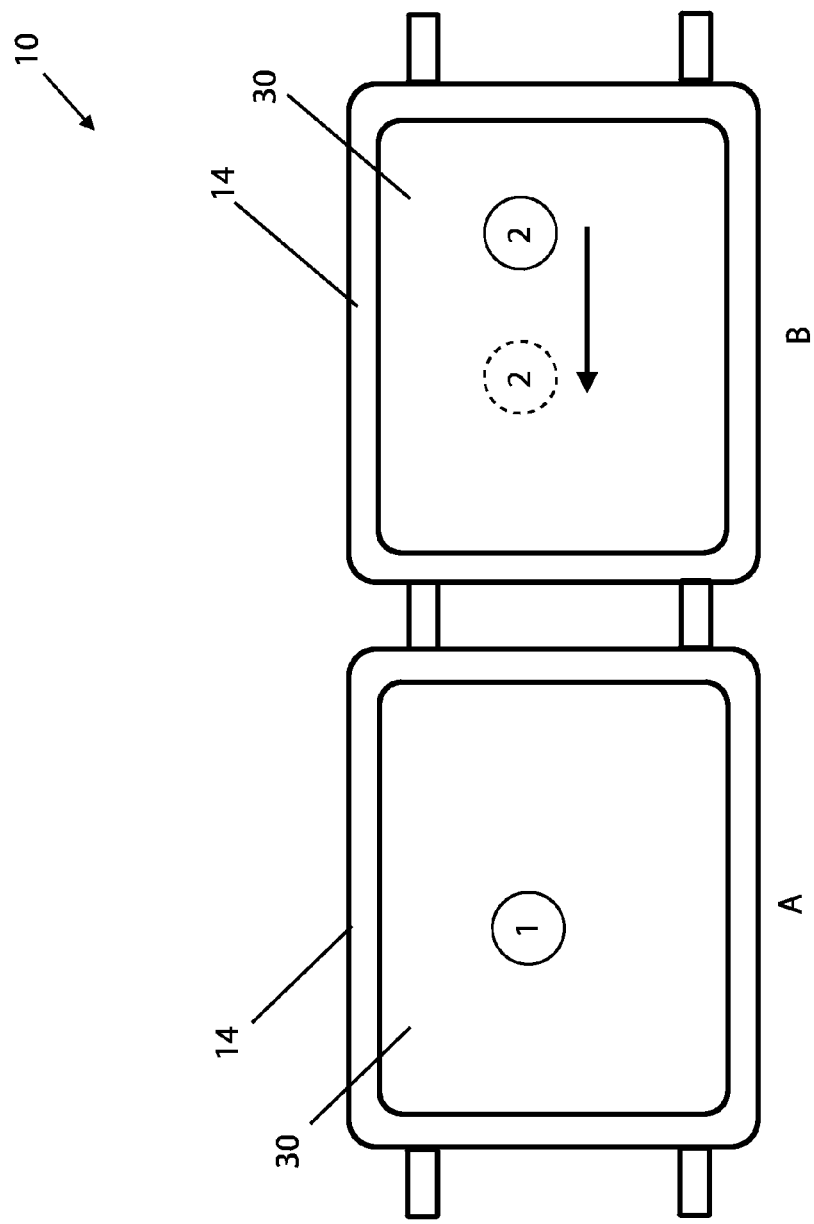
Figure 8:
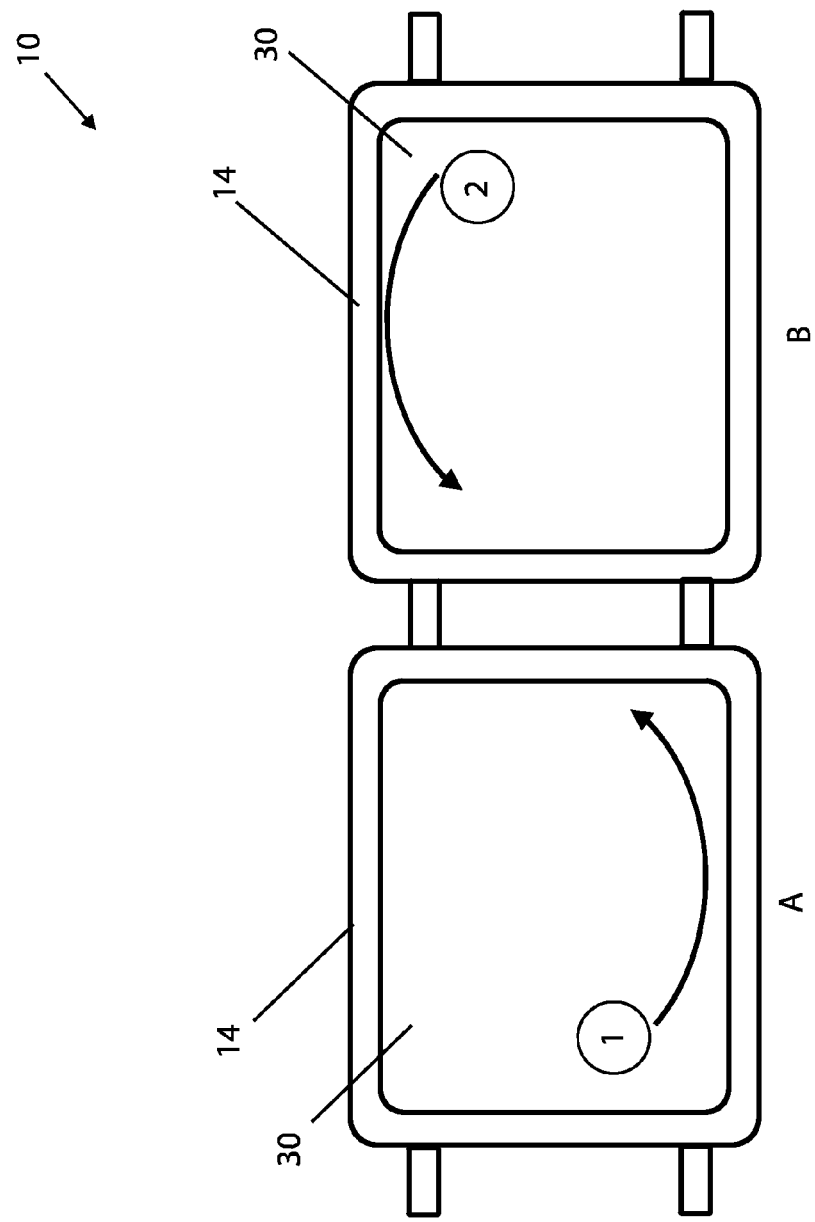
Figure 8A:
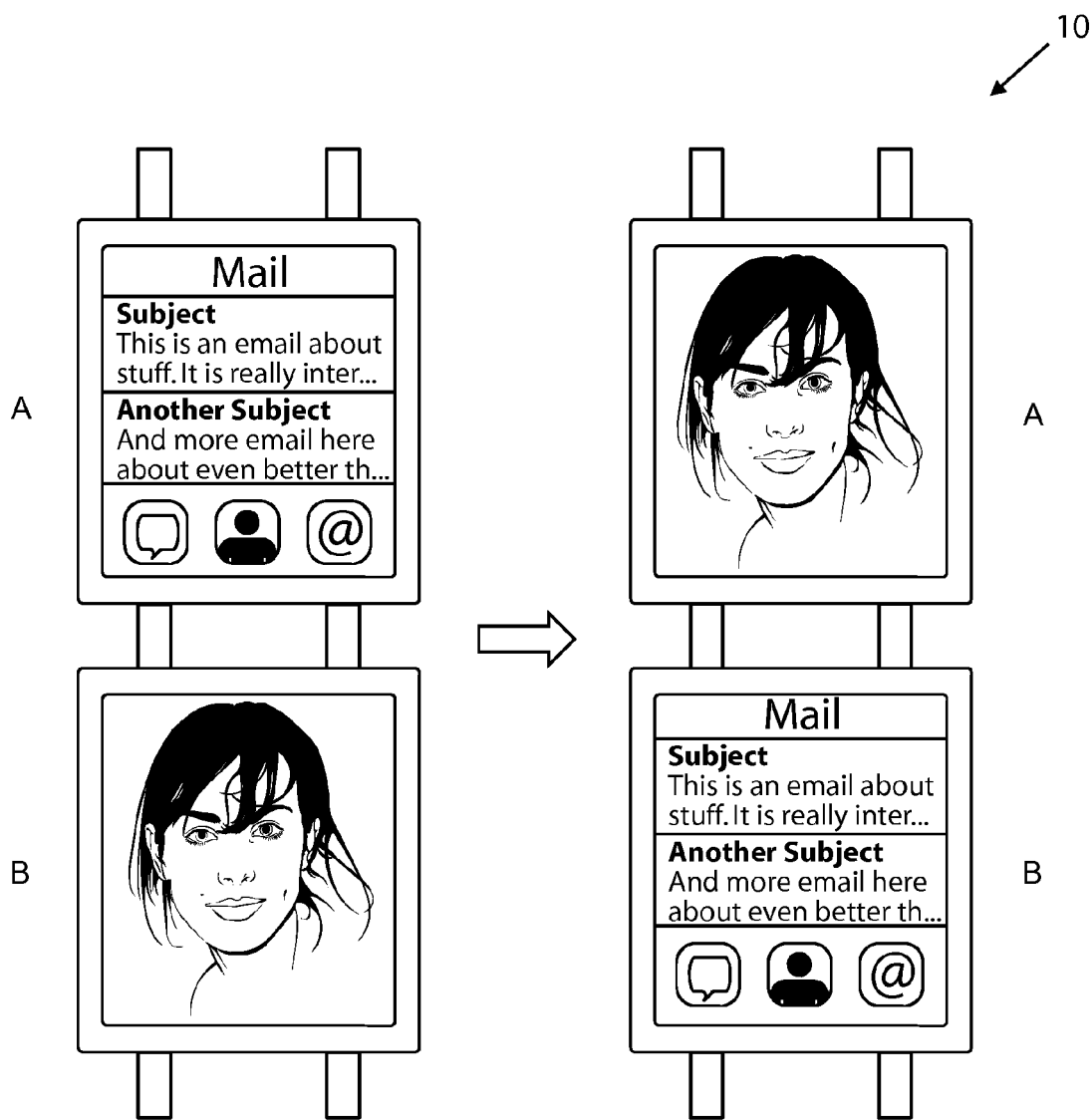
Figure 9:
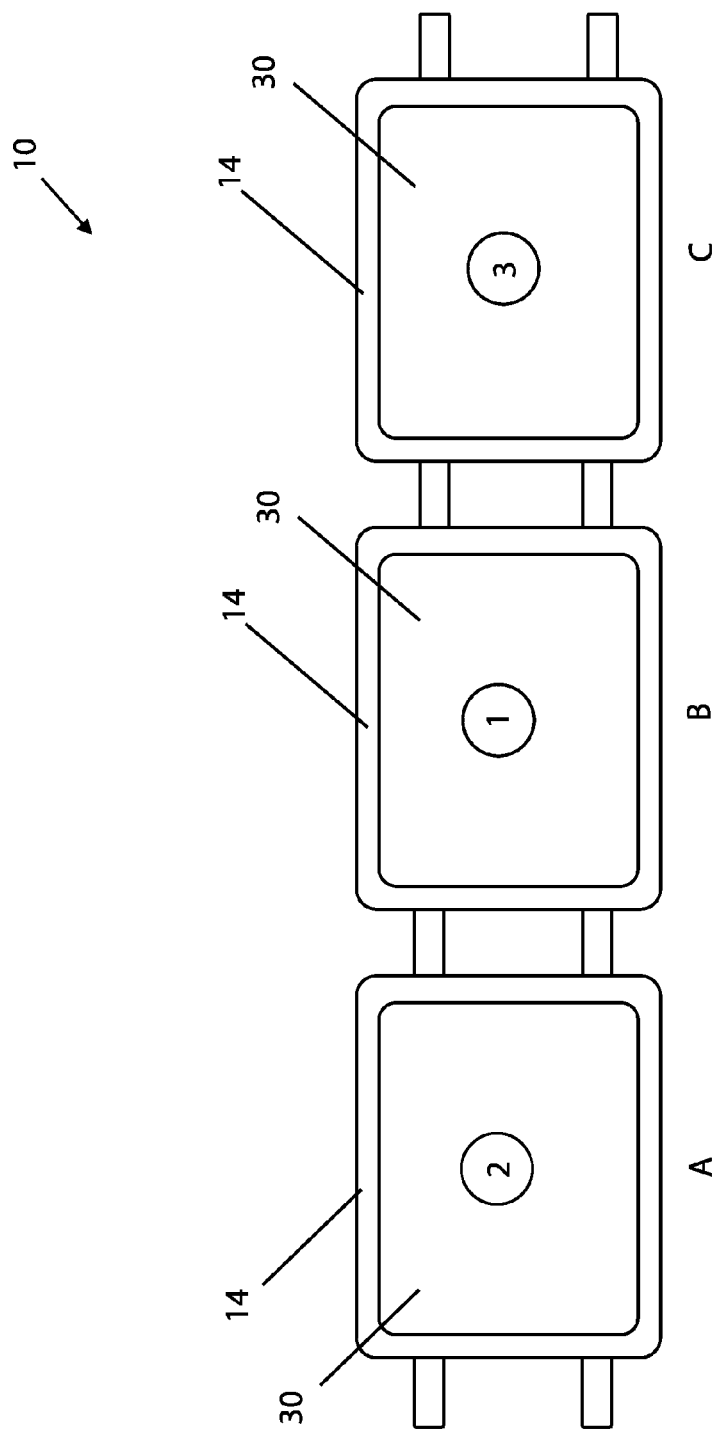
Figure 10B:
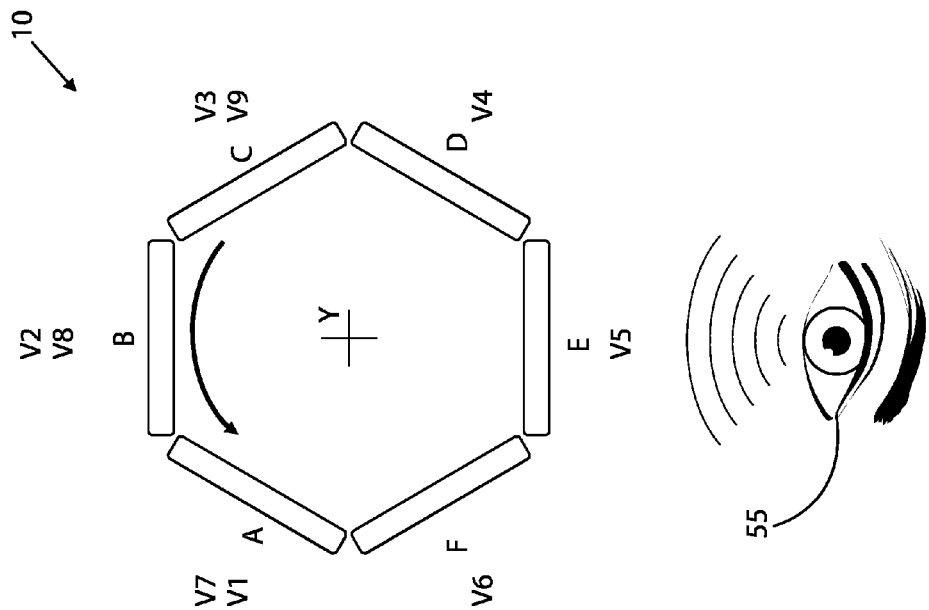
Figure 10A:
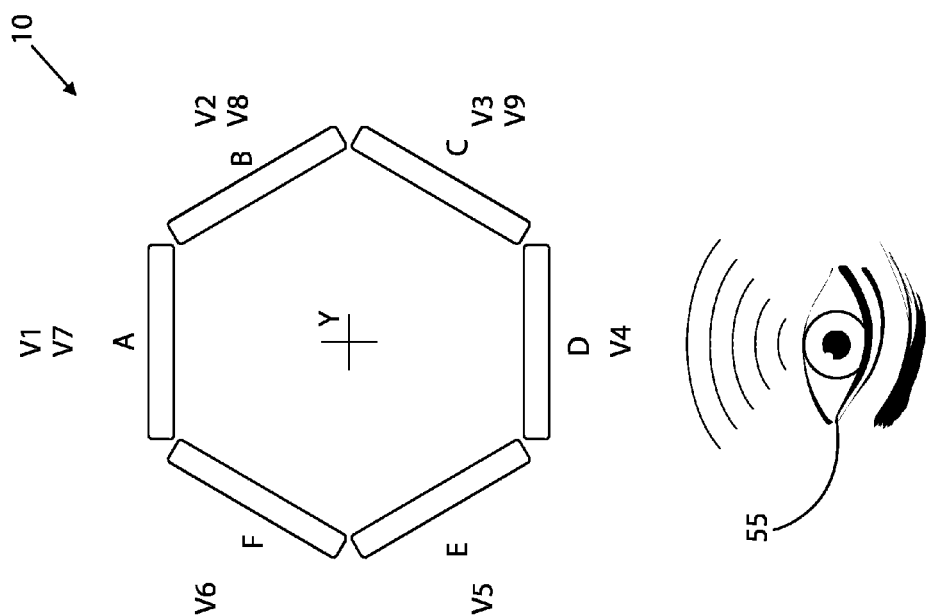
Figure 10C:
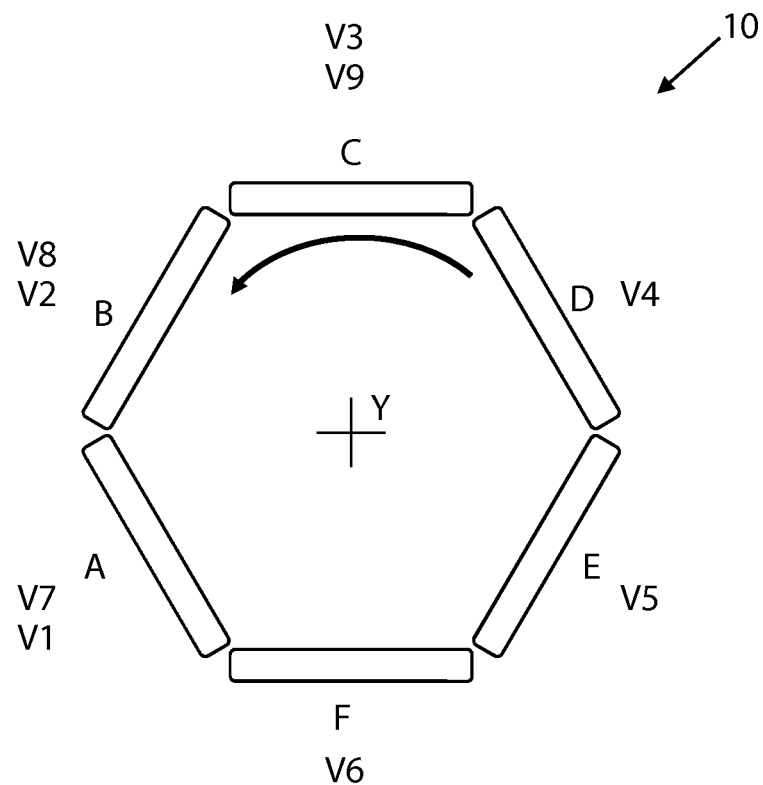
Figure 10C:
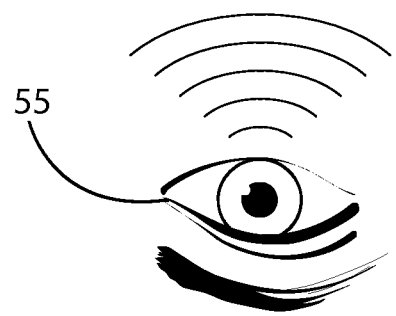
Figure 11:
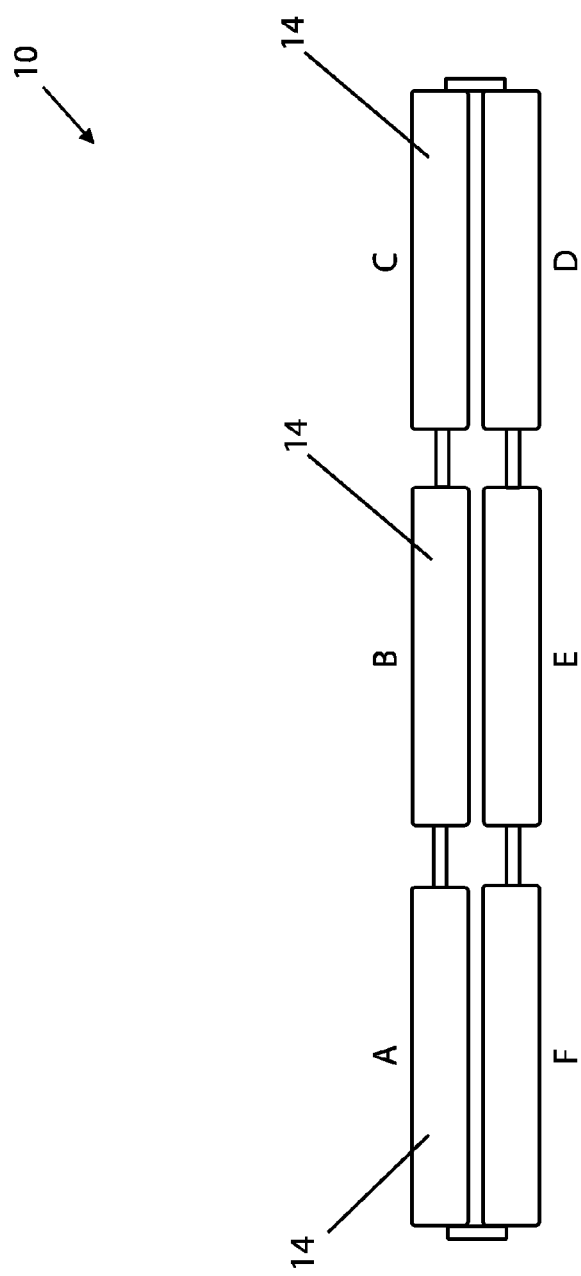
Figure 15:
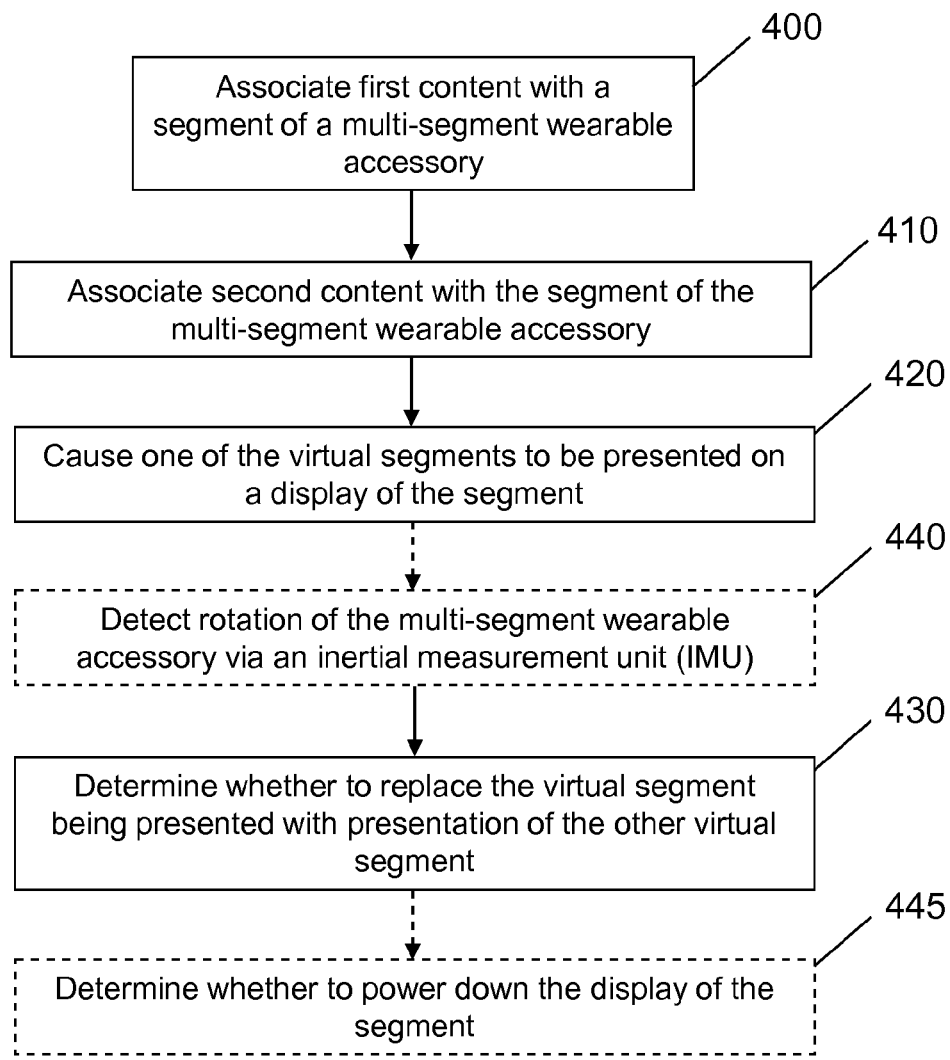
Figure 16:
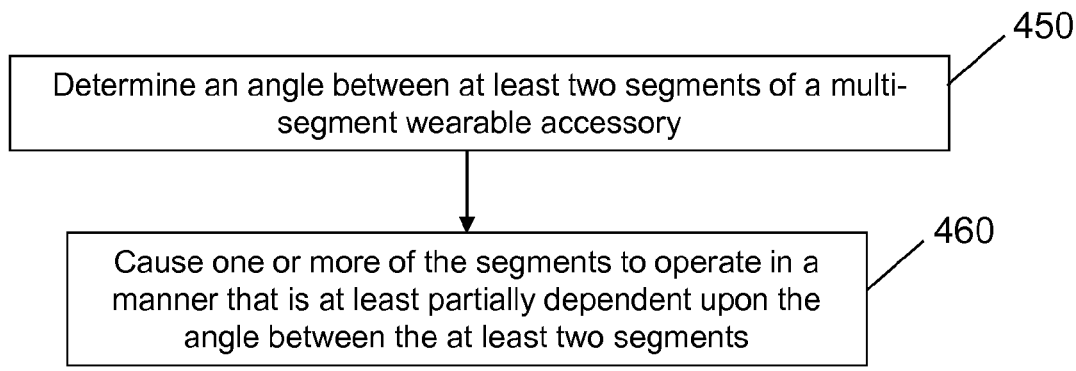
Figure 17:
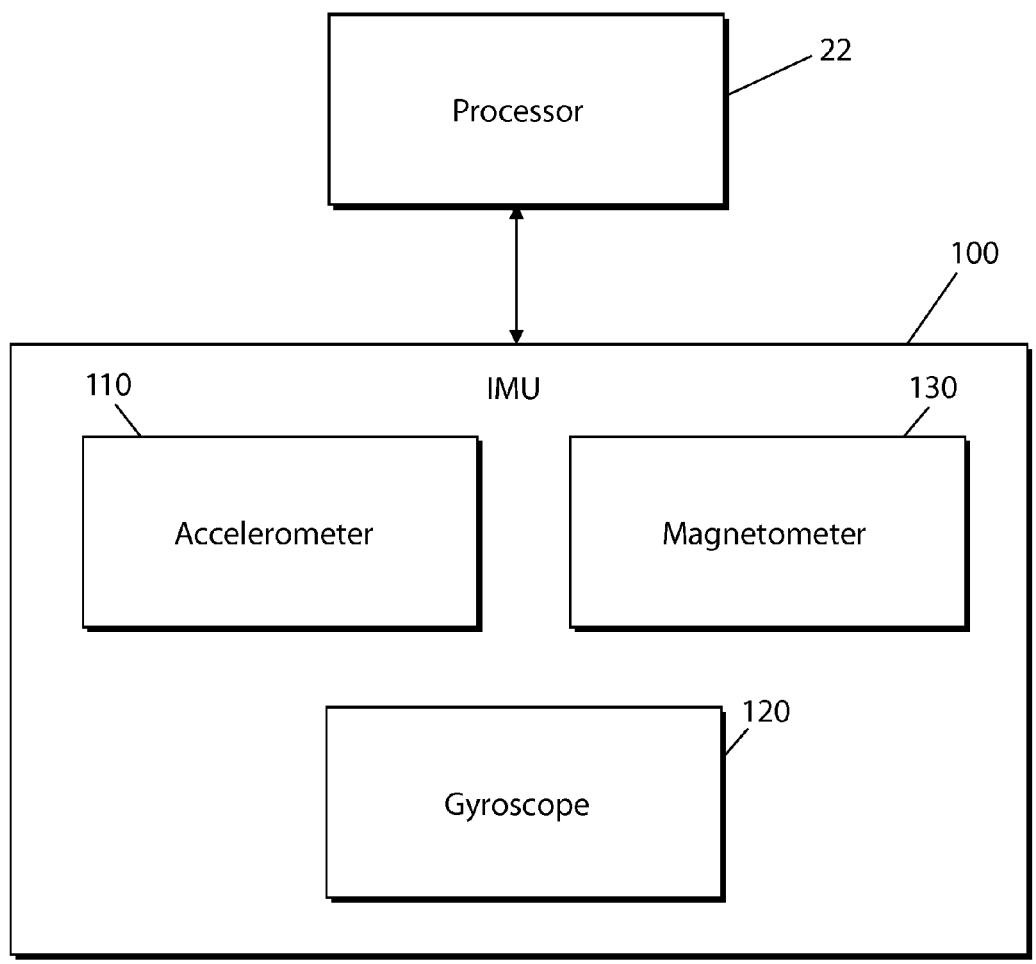

Having thus described certain embodiments of the invention in general terms, reference will now be made to the accompanying drawings, which are not necessarily drawn to scale, and wherein:

FIG. 1 illustrates an exploded perspective view of a multi-segment wearable accessory that may be specifically configured according to an example embodiment of the present invention;

FIG. 2 illustrates a schematic block diagram of an apparatus that may be specifically configured according to an example embodiment of the present invention;

FIG. 3 illustrates a plan view of a multi-segment wearable accessory that may be specifically configured according to an example embodiment of the present invention;

FIG. 4 illustrates a side view of a multi-segment wearable accessory that may be specifically configured according to an example embodiment of the present invention;

FIG. 5 illustrates a plan view of two segments of a multi-segment wearable accessory that depicts movement of the touch input upon one of the segments according to an example embodiment of the present invention;

FIGS. 5A and 5B illustrate the effects on content displayed on the segments as a result of touch input applied according to FIG. 5;

FIG. 6 illustrates a plan view of three segments of a multi-segment wearable accessory that depicts movement of the touch inputs upon two of the segments according to an example embodiment of the present invention;

FIG. 6A illustrates the effects on content displayed on the segments as a result of touch input applied according to FIG. 6;

FIG. 7 illustrates a plan view of two segments of a multi-segment wearable accessory that depicts movement of the touch input upon one of the segments in an opposite direction from that shown in FIG. 5 according to an example embodiment of the present invention;

FIG. 8 illustrates a plan view of two segments of a multi-segment wearable accessory that depicts a rotational gesture according to an example embodiment of the present invention;

FIG. 8A illustrates the effects on content displayed on the segments as a result of touch input applied according to FIG. 8;

FIG. 9 illustrates a plan view of three segments of a multi-segment wearable accessory that depicts touch input applied according to an example embodiment of the present invention;

FIGS. 10A-10C illustrate side views of a multi-segment wearable accessory depicting the association of different virtual segments with the segments of the multi-segment wearable accessory according to an example embodiment of the present invention;

FIG. 11 illustrates a side view of a multi-segment wearable accessory that has been positioned in a flat configuration;

FIGS. 12-16 illustrate flowcharts of methods of providing and/or interacting with content on a multi-segment wearable accessory according to another example embodiment of the present invention; and FIG. 17 illustrates a schematic representation of an inertial measurement unit (IMU) of one or more segments of the multi-segment wearable accessory according to an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory, physical storage medium (e.g., volatile or non-volatile memory device), can be differentiated from a "computer-readable transmission medium," which refers to an electromagnetic signal.

Referring now to FIG. 1, an exploded perspective view of a multi-segment wearable accessory 10 is provided. Although generally described herein as a wearable accessory in the form of a bracelet, the multi-segment wearable accessory may be embodied in various other manners including, for example, as an anklet, a necklace, a ring or the like. As shown in FIG. 1, the multi-segment wearable accessory 10 of one example embodiment includes a frame 12 that is sized and shaped to extend about the respective body part, such as a wrist, an ankle, a finger or the like. The frame 12 may be formed of various materials including various metallic materials, plastic materials, composite materials, etc.

In one embodiment, the frame 12 is relatively rigid so as to maintain a predefined shape, while in other embodiments, the frame is at least somewhat flexible or movable. In the illustrated embodiment, however, the frame includes a plurality of links or frame members 13 that are connected to one another so as to define a closed shape. Although the frame members 13 of the embodiment of FIG. 1 are shown to have a peripheral frame structure that defines a central opening, the frame members may be solid segments with no opening defined therethrough in other embodiments. Although the frame members 13 may have different shapes and sizes, the multi-segment wearable accessory 10 of one embodiment includes a plurality of identical frame members so as to permit the segments to be attached to any one of the frame members, as described below.

In addition to the frame 12, the multi-segment wearable accessory 10 includes a plurality of segments 14. Each segment 14 is configured to be attached, such as by being removably attached, to a respective frame member 13. The segments 14 may be attached to the frame member 13 in any of various manners, including by means of a snap-fit engagement. The segments 14 may provide different functionality as described below and may be mounted upon the frame 12 in any sequence that is desired. While the segments 14 may provide a wide variety of functionality, examples of the functionality provided by some of the segments include segments that may provide for telephone functionality in order to support voice calls, music player functionality, game playing functionality, email or other messaging functionality, Facebook or other social media functionality or the like.

In one embodiment, a user may therefore select the segments 14 that are to be mounted upon the frame 12 based upon the functionality that the user desires the multi-segment wearable accessory 10 to have depending, for example, upon the context in which the user will be wearing the multi-segment wearable accessory. Thus, the user may change the segments 14 mounted upon the frame 12 of the multi-segment wearable accessory 10 of one embodiment from time to time as the context in which the user will be wearing the multi-wearable accessory changes, such as from a work environment, to an evening out with friends or the like.

As noted above, each segment 14 may provide certain functionality. As such, each segment 14 may include or otherwise embody an apparatus 20 configured to provide the respective functionality such as shown in FIG. 2. While each segment 14 may be independently operable and, as such, may include each of the elements of the apparatus 20 depicted in FIG. 2 and described below, some of the segments may be configured to cooperate with other segments in order to utilize at least some of the resources of the other segments, thereby reducing the resource requirements of the respective segment. For example, a segment 14 may be configured to utilize the processing resources of another segment, thereby reducing or eliminating the processing requirements of the respective segment. Thus, each segment 14 of a multi-segment wearable accessory 10 need not include each of the elements of the apparatus 20 depicted in FIG. 2 and described below with the apparatus of FIG. 2 being, instead, described by way of an example, but not of limitation. In yet another embodiment, the apparatus 20 may be embodied, either entirely or partly, by another device, such as a mobile terminal, that is in communication with one or more segments 14 of the multi-segment wearable accessory 10, thereby permitting multiple segments to utilize the same apparatus.

With reference to FIG. 2, an apparatus 20 for controlling the operations of one or more segments of a multi-segment wearable accessory 10 is illustrated in accordance with one embodiment of the present invention. The apparatus 20 of FIG. 2 may be embodied by a segment or may be distributed across and therefore embodied by a plurality of segments. Still further, the apparatus 20 or at least elements of the apparatus may be embodied by a remote device, such as a mobile terminal, that is in communication with the segments of the multi-segment wearable apparatus. For purposes of illustration, but not of limitation, the apparatus 20 will be hereinafter described in conjunction with an embodiment in which the apparatus is embodied by a respective segment of the multi-segment wearable accessory.

It should also be noted that while FIG. 2 illustrates one example of a configuration of an apparatus 20 for controlling the operations of one or more segments of a multi-segment wearable accessory, numerous other configurations may also be used to implement embodiments of the present invention. As such, in some embodiments, although devices or elements are shown as being in communication with each other, hereinafter such devices or elements should be considered to be capable of being embodied within a same device or element and, thus, devices or elements shown in communication should be understood to alternatively be portions of the same device or element.

With continued reference to FIG. 2, the apparatus 20 for controlling the operations of one or more segments of a multi-segment wearable accessory may include or otherwise be in communication with a processor 22, a user interface transceiver 24, a communication interface 26, and a memory 28. In some embodiments, the processor 22 (and/or co-processors or any other processing circuitry assisting or otherwise associated with the processor) may be in communication with the memory 28 via a bus for passing information among components of the apparatus 20. The memory 28 may include, for example, one or more volatile and/or non-volatile memories. In other words, for example, the memory 28 may be an electronic storage device (e.g., a computer readable storage medium) comprising gates configured to store data (e.g., bits) that may be retrievable by a machine (e.g., a computing device like the processor 22). The memory 28 may be configured to store information, data, content, applications, instructions, or the like for enabling the apparatus 20 to carry out various functions in accordance with an example embodiment of the present invention. For example, the memory 28 could be configured to buffer input data for processing by the processor 22. Additionally or alternatively, the memory 28 could be configured to store instructions for execution by the processor 20.

In some embodiments, the apparatus 20 may be embodied as a chip or chip set. In other words, the apparatus 20 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 20 may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor 22 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 22 may include one or more processing cores configured to perform independently. A multi-core processor may enable multiprocessing within a single physical package. Additionally or alternatively, the processor 22 may include one or more processors configured in tandem via the bus to enable independent execution of instructions, pipelining and/or multithreading.

In an example embodiment, the processor 22 may be configured to execute instructions stored in the memory 28 or otherwise accessible to the processor. Alternatively or additionally, the processor 22 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 22 is embodied as an ASIC, FPGA or the like, the processor may be specifically configured hardware for conducting the operations described herein. Alternatively, as another example, when the processor 22 is embodied as an executor of software instructions, the instructions may specifically configure the processor to perform the algorithms and/or operations described herein when the instructions are executed. The processor 22 may include, among other things, a clock, an arithmetic logic unit (ALU) and logic gates configured to support operation of the processor.

Meanwhile, the communication interface 26 may be any means such as a device or circuitry embodied in either hardware or a combination of hardware and software that is configured to receive and/or transmit data from/to a network and/or any other device or module in communication with the apparatus 20, such as by communicating with the communication interface of other segments of the multi-segment wearable accessory. In this regard, the communication interface 26 may include, for example, an antenna (or multiple antennas) and supporting hardware and/or software for enabling communications with a wireless communication network. Additionally or alternatively, the communication interface 26 may include the circuitry for interacting with the antenna(s) to cause transmission of signals via the antenna(s) or to handle receipt of signals received via the antenna(s). In one embodiment, the communication interface 26 is configured to support near field communications (NFC) or other proximity-based communications techniques. In some environments, the communication interface 26 may alternatively or also support wired communication. As such, for example, the communication interface 26 may include a communication modem and/or other hardware/software for supporting communication via cable, digital subscriber line (DSL), universal serial bus (USB) or other mechanisms.

The user interface transceiver 24 may be in communication with the processor 22 to receive an indication of a user input and/or to cause provision of an audible, visual, mechanical or other output to the user. As such, the user interface transceiver 24 may include, for example, a display, a touch screens, touch areas, soft keys, a microphone, a speaker or other input/output mechanisms. Alternatively or additionally, the processor 22 may comprise user interface circuitry configured to control at least some functions of one or more user interface elements such as, for example, a speaker, ringer, microphone, display, touch screen and/or the like. The processor 22 and/or user interface circuitry comprising the processor may be configured to control one or more functions of one or more user interface elements through computer program instructions (e.g., software and/or firmware) stored on a memory accessible to the processor (e.g., memory 28 and/or the like).

In an example embodiment, the apparatus 20 may include or otherwise be in communication with a touch screen display 30. In different example cases, the touch screen display 30 may be a two dimensional (2D) or three dimensional (3D) display. The touch screen display 30 may be embodied as any known touch screen display. Thus, for example, the touch screen display 30 could be configured to enable touch recognition by any suitable technique, such as resistive, capacitive, infrared, strain gauge, surface wave, optical imaging, dispersive signal technology, acoustic pulse recognition, and/or other techniques. The user interface transceiver 24 may be in communication with the touch screen display 30 to receive touch inputs at the touch screen display and to analyze and/or modify a response to such indications based on corresponding user actions that may be inferred or otherwise determined responsive to the touch inputs.

With continued reference to FIG. 2, in an example embodiment, the apparatus 20 may include a touch screen interface 32. The touch screen interface 32 may, in some instances, be a portion of the user interface transceiver 24. However, in some alternative embodiments, the touch screen interface 32 may be embodied as the processor 22 or may be a separate entity controlled by the processor. As such, in some embodiments, the processor 22 may be said to cause, direct or control the execution or occurrence of the various functions attributed to the touch screen interface 32 (and any components of the touch screen interface) as described herein. The touch screen interface 32 may be any means such as a device or circuitry operating in accordance with software or otherwise embodied in hardware or a combination of hardware and software (e.g., processor 22 operating under software control, the processor embodied as an ASIC or FPGA specifically configured to perform the operations described herein, or a combination thereof) thereby configuring the device or circuitry to perform the corresponding functions of the touch screen interface as described herein. Thus, in examples in which software is employed, a device or circuitry (e.g., the processor 22 in one example) executing the software forms the structure associated with such means.

The touch screen interface 32 may be configured to receive an input in the form of a touch event at the touch screen display 30. As such, the touch screen interface 32 may be in communication with the touch screen display 30 to receive user inputs at the touch screen display and to modify a response to such inputs based on corresponding user actions that may be inferred or otherwise determined responsive to the inputs. Following recognition of a touch event, the touch screen interface 32 may be configured to determine a classification of the touch event and provide a corresponding function based on the touch event in some situations.

In some embodiments, the touch screen interface 32 may include a detector 34, a display manager 36, and a gesture classifier 38. Each of the detector 34, the display manager 36, and the gesture classifier 38 may be any device or means embodied in either hardware or a combination of hardware and software configured to perform the corresponding functions associated with the detector 34, the display manager 36, and the gesture classifier 38, respectively, as described herein. In an exemplary embodiment, each of the detector 34, the display manager 36, and the gesture classifier 38 may be controlled by or otherwise embodied as the processor 22.

The detector 34 may be in communication with the touch screen display 30 to receive user inputs in order to recognize and/or determine a touch event based on each input received at the detector. A touch event may be defined as a detection of an object, such as a stylus, finger, pen, pencil or other object, coming into contact with a portion of the touch screen display 30 in a manner sufficient to register as a touch. In this regard, for example, a touch event could be a detection of pressure on the screen of the touch screen display 30 above a particular pressure threshold over a given area. Subsequent to each touch event, the detector 34 may be further configured to pass along the data corresponding to the touch event (e.g., location of touch, length of touch, number of objects touching, touch pressure, touch area, speed of movement, direction of movement, length of delay, frequency of touch, etc.) to the gesture classifier 38 for gesture classification. As such, the detector 34 may include or be in communication with one or more force sensors configured to measure the amount of touch pressure (e.g., force over a given area) applied as a result of a touch event, as an example.

The gesture classifier 38 may be configured to recognize and/or determine a corresponding classification of a touch event. In other words, the gesture classifier 38 may be configured to perform gesture classification to classify the touch event as any of a number of possible gestures. Some examples of recognizable gestures may include a touch, multi-touch, stroke, character, symbol, shape, pinch event (e.g., a pinch in or pinch out), rotation and/or the like.

A touch may be defined as a touch event that impacts a single area (without or with minimal movement on the surface of the touch screen display 30) and then is removed. A multi-touch may be defined as multiple touch events sensed concurrently (or nearly concurrently). A stroke may be defined as a touch event followed immediately by motion of the object initiating the touch event while the object remains in contact with the touch screen display 30. In other words, the stroke may be defined by motion following a touch event thereby forming a continuous, moving touch event defining a moving series of instantaneous touch positions (e.g., as a drag operation or as a flick operation). Multiple strokes and/or touches may be used to define a particular shape or sequence of shapes to define a character or symbol.

The gesture classifier 38 may also be configured to communicate detection information regarding the recognition, detection, and/or classification of a touch event to the display manager 36. The display manager 36 may be configured to provide control over modifications made to that which is displayed on the touch screen display 30 based on the detection information received from the detector 34 and gesture classifications provided by the gesture classifier 38 in accordance with the responses prescribed for each respective gesture classification and implementation characteristic determined by the gesture classifier. In other words, the display manager 36 may configure the display (e.g., with respect to the content displayed and/or the user interface effects presented relative to the content displayed) according to the gesture classification and implementation characteristic classification determined for a given touch event that may be detected at the display.

As noted above, in some embodiments, a wearable segment 14 and, as such, the apparatus 20 embodied by or otherwise associated with the segment may be configured to have a dedicated functionality, such as a functionality that is specific to a particular application, activity, task, or person. For example, a wearable segment may be pre-configured to display information associated with an e-mail application only or a messaging application only. Another segment may be dedicated to only providing notifications to the user from one or more different applications, such as applications associated with other segments (such as the e-mail-dedicated segment mentioned above) and/or other devices (such as the user's cellular telephone). For example, this segment may display notifications of received e-mails, incoming calls, event reminders, network connectivity, the detected presence of nearby devices, etc. Yet another segment may be dedicated to providing information regarding a certain person specified by the user. For example, the user may configure such a segment to display e-mail messages, text messages, telephone information (e.g., missed calls), etc. received only from the user's spouse.

In other embodiments, however, a wearable segment 14 and, as such, the apparatus 20 embodied by or otherwise associated with the segment may be configured to provide multiple functionalities. For example, a segment may be able to execute multiple different applications or to execute different applications and also provide notifications generated by those and other applications. Thus, in some cases, by selecting at least one segment that is configured to support multiple functionalities and selecting other segments each having a dedicated functionality, the functionality of the dedicated segments may be at least partially controlled by the multi-functional segment(s). In other words, one of the segments (e.g., a multi-functional segment) may, in some cases, coordinate the behavior of other segments on the wearable accessory.

Once the multi-segment wearable accessory 10 has been assembled by attaching the segments 14 that provide the desired functionality to the frame 12, the segments of one embodiment may discover or identify the other segments of the multi-segment wearable accessory. In this regard, the segments 14 may communicate with one another via the respective communication interfaces 26, such as via respective NFC interfaces. As such, the segments 14 may identify other segments that comprise the multi-segment wearable accessory 10 as well as the relative positions of the segments, such as the segments that are adjacent to one another or spaced apart from one another, as described further below. Further, the segments 14 of one embodiment may identify the functionality provided by the other segments during this discovery process.

In one embodiment, the plurality of segments 14 of a multi-segment wearable accessory 10 may cooperate with one another in order to provide various functions to the user. In this regard, the segments 14 may interact in various manners. For example, one of the segments 14 may be considered a master segment and, as such, may control the operations and interactions of the other segments, which would be considered slave segments in this embodiment. Alternatively, control of the operations of the plurality of segments 14 of a multi-segment wearable accessory 10 may be distributed with each or at least a plurality of the segments of the multi-segment wearable accessory controlling at least some of the operations. Even in an instance in which the control of the segments of a multi-segment wearable accessory 10 is distributed such that each segment 14 controls its own operations, the plurality of segments may still be configured to cooperate with one in other in order to provide improved performance for the user, as will be described below.

In this regard, the arrangement of multiple independent segments 14 on a wearable accessory 10, such as the bracelet shown in FIGS. 1 and 3, may allow the functionality of each segment to be modified or enhanced based on the association of the particular segment with other segments mounted to the wearable accessory. For example, the touch display 30 of one segment 14 may, in some cases, serve as an extension of the display of an adjacent segment, as described in greater detail below. Moreover, the relationship of a particular segment 14 to the wearable accessory 10 as a whole and/or to the user (e.g., the orientation and/or position of the segment with respect to an axis Y of the wearable accessory or to the user's gaze) may affect the content that is display on the particular segment and/or the presentation of such content.

In this regard, the apparatus 20 associated with each segment 14 may include one or more sensors 40 that are configured to allow one or more first segments of a multi-segment wearable accessory 10 to be distinguished from one or more second segments of the wearable accessory. For example, each segment 14 may have one or more magnetometers (e.g., to detect an angle of the segment with respect to the earth's gravitational field), accelerometers (e.g., to detect movement of the segment as the user's arm is moved about), and touch or contact sensors (e.g., to detect a contact with or movement between a segment and the user). Moreover, each segment 14 may be configured to communicate with nearby segments, such as via near field communication techniques supported by the communication interface 26, to share data regarding the respective segment's orientation and position. Using information received from nearby segments 14, each segment, such as the processor 22 associated with each segment, may determine its distance from a common Y-axis (e.g., the distance between its own y-axis and the common Y-axis).

For example, with reference to FIG. 4, a wearable accessory 10 according to one example embodiment may include six segments 14, labeled for explanatory purposes in FIG. 4 as segments A-F. Each segment 14 may define its own y-axis and may, as a result of being mounted to the frame 12, share a common Y-axis (which may, e.g., be indicative of an angle of the wearer's arm 50, as shown in FIG. 3). By receiving data from nearby segments 14, the processor 22 associated with each segment may determine whether the respective segment is part of a wearable accessory 10 and which other segments are also a part of the same wearable accessory. For example, the processor 22 associated with segment A may determine the location of the common Y-axis by receiving data from segments B-F regarding the location of their respective y-axes and mathematically determining the median Y-axis of all the segments. The processor 22 associated with segment A may then calculate the distance d between its own y-axis and this median Y-axis and share this information with other segments, receiving their information regarding the distance d between their own y-axes and the median Y-axis in turn (e.g., using magnetometer measurements). If the distance d between a given segment's y-axis and the median Y-axis of all of the segments is sufficiently small (e.g., less than a predetermined distance), that segment, such as the processor 22 associated with the segment, may determine that it is part of the wearable accessory 10. In this way, the processor 22 associated with each segment 14 may determine the respective segment's membership with the wearable accessory 10 and may share this data with other segments. In some cases, the magnetometer data may be enhanced by coupling such measurements with accelerometer measurements from each of the segments (e.g., as an indication of which segments are moving in relatively the same direction at relatively the same speed). Moreover, the determination of which segments 14 are members of the same wearable accessory 10 may be refreshed or recalculated periodically or upon the occurrence of a predetermined event (such as a sudden change in direction or motion).

In addition, the rotation of each segment 14 with respect to the common Y-axis may be determined by the respective processor 22. Referring to FIGS. 3 and 4, when the user's arm is in a horizontal position (such as the position the user might take when looking at the display 16 of a topmost segment 14 (segment A in FIG. 4), the topmost segment A may be considered to be at an angle closest to 0° with respect to the common Y-axis. In a six-segment accessory, as depicted for purposes of example, segment B and segment F may be considered to be at an angle of approximately 60° and 300°, respectively; segment C and segment E may be considered to be at an angle of approximately 120° and 240°, and segment D may be considered to be at an angle of approximately 180°. The angle of each segment 14 may be determined by the processor 22 using a magnetometer and accelerometer, for example, and the determined angles may be used to discern a sequential ordering of the multiple segments (A-F).

Using the information calculated and determined regarding each segment's membership with the wearable accessory 10, its relative rotation about the common Y-axis, and its orientation about its own y-axis, the pose of the wearable accessory 10 and the user's arm 50 may be determined by the processor 22. In this regard, pose information may thus include how the different segments 14 are being rotated about the wrist (or common Y-axis) and at what angle the user's arm 50 is positioned (e.g., pointing down at the user's sides or held up horizontally for viewing the wearable accessory).

In some embodiments, one or more of the segments 14 may include an inertial measurement unit (IMU) or other electronic device that measures and provides data regarding a segment's velocity, orientation, and gravitational forces. With reference to FIG. 17, for example, an IMU 100 may include one or more accelerometers 110, gyroscopes 120, and/or magnetometers 130 that are configured to sense a corresponding segment's movement with response to a reference position.

Based on the position (e.g., distance from the Y-axis, rotation, orientation, and/or order) relative to the user and/or relative to other segments 14, one or more of the segments may be configured to operate in a manner that is different from how other segments operate. For example, in one embodiment, private information may be presented on the respective displays 30 of one or more first segments, whereas non-private information may be presented on the respective displays of one or more second segments. With reference to FIG. 4, the segments 14 closest to the user's gaze (represented by the eye 55) may be considered the first segments (e.g., segments F, A, and B), whereas the oppositely-located segments farthest from the user's gaze (in this case, segments C, D, and E, which are obscured from the user's line of sight) may be considered the second segments. Thus, in the depicted example, the first segments F, A, and B may be caused by the respective processors 22 to display private information, such as e-mail messages, text messages, or other information designated by the user as being private. The second segments C, D, and E, on the other hand, may be caused by the respective processors 22 to display non-private information. Such information may include, for example, weather information, the time, an idle or lock screen, or advertisement information.

As such, the private information may only be seen by the user by virtue of the position of the respective segments upon which the private information is displayed, while the non-private information may be seen by people other than the user. Although the example above describes three first segments for displaying private information and three second segments for displaying non-private information, the private information may be displayed on one or two of the segments in the user's direct line of sight (e.g., segments A and B) while the non-private information may be displayed on all or fewer than all of the remaining segments.

In other embodiments, one or more of the second segments, rather than being caused to display non-private information, may be controlled by the respective processors 22 to have their displays 30 dimmed, turned off, or otherwise modified to reduce the power consumption of the second segment(s) relative to the one or more first segments. In this way, segments that are not considered to be useful to the user (e.g., are not in the user's direct line of sight or are obscured from being viewed by the user) may enter a power saving mode in which, for example, their respective displays 30 are not presenting any information to the user or to others.

In still other cases, input received via the touch screen display 30 of one or more second segments may be provided to the processor 20 associated with one or more second segments such that the processor associated with the one or more second segments may at least partially control the operation of the one or more first segments based on the received user input. Referring again to FIG. 4, for example, one or more of segments C, D, and E may be configured to receive touch inputs on their respective displays 30 to at least partially control one or more of segments F, A, and B. For example, touch inputs received on the touch display 30 of segment D may at least partially control the opposite segment, segment A. Thus, the user may zoom in on certain content displayed on segment A, for example, by applying a pinch out input (a multi-touch input in which the touch events causing the multi-touch are relatively close together, followed by movement of the multi-touch inputs substantially away from each other) to the touch display of segment D. By using segment D in this example to receive touch inputs on behalf of segment A, the information displayed on segment A may remain fully visible to the user during receipt of the input, rather than be obscured from view by the presence of the user's fingers on the display of segment A in this example.

Although each segment 14 of the wearable accessory 10 may be configured to provide different functionality to the user, in some cases, through communication between and among the different segments, such as via NFC supported by the respective communication interfaces 26, and by virtue of their membership to the same wearable accessory and their relative positions within the wearable accessory, two or more segments may share at least portions of their respective functionality. For example, in some cases, two adjacent segments may cooperate to present the same content across the two respective displays 30 (e.g., acting as one, larger display), or one segment may instruct an adjacent segment regarding the content to be displayed by the adjacent segment.

Accordingly, in one embodiment, touch input may be received via the user interface transceivers 24 of at least first and second segments of a multi-segment wearable accessory 10, and a determination may be made, such as by the touch screen interface 32, the processor 22 or the like, that the touch input associated with the second segment is moving relative to the touch input associated with the first segment. A presentation of a window that is presented at least partially on the display of the first segment may then be modified based upon the movement of the touch input associated with the second segment.

For example, touch inputs may be received to expand an application from one segment onto additional segments (e.g., by causing the size of the window presented on the display to be increased so as to be presented by the displays on both the first and second segments) using a multi-segment, multi-touch pinch out input, as depicted schematically in FIG. 5. In this regard, the first touch input (e.g., applied by a first finger of the user, shown by the encircled 1) may be placed on content displayed via a first segment A, and a second touch input (e.g., applied by a second finger of the user, shown by the encircled 2) may be placed on a different segment B, where the first touch input specifies the application or content to be expanded and the second touch input specifies the segment into which the content should be expanded. The second touch input may then be moved away from the location of the first touch input (e.g., while the first touch input remains stationary, as shown in FIG. 5), and once the second touch input passes a certain threshold (e.g., two-thirds of the display screen width), the touch inputs may be removed and the expansion will be executed. In some cases, removing the touch inputs before the threshold is passed may cancel the expansion operation.

In embodiments in which multiple applications or portions of content are displayed on the same segment selected for expansion, the content corresponding to the location of the first touch input may determine which content is to be expanded, and the other content may remain unexpanded on the first segment.

In cases where content was formerly presented on the display of the second segment (e.g., segment B), this content may in some instances be obscured by the overlaying of the content expanded from segment A, as illustrated in FIG. 5A. In other instances, however, the content presented on the display of the second segment B prior to the expansion of the content from the first segment A (e.g., prior to the increase in size of the window displayed on segment A) may be displaced by the content from segment A, in effect pushing the former content of B in a direction away from segment A. This is illustrated in FIG. 5B. In some cases, the displaced content may, in turn, displace content that is presented on the next adjacent segment (e.g., segment C) or some other subsequent segment. As such, each window of content may, in some cases, be considered a virtual segment, with multiple virtual segments potentially sharing the same physical segment 14 through the overlay of one virtual segment atop another virtual segment, as will be described in greater detail below.

In still other embodiments, touch inputs may be received via the touch screen displays 30 of first, second, and third segments (e.g., segments A, B, and C, as depicted in FIG. 6). Upon determining that the touch input 2 associated with the second segment (segment A) and the touch input 3 associated with the third segment (segment C) are moving relative to the touch input associated with the first segment (segment B), the presentation of the window that is presented at least partially by the first segment (segment B) may be modified based upon movement of the touch inputs associated with the second and third segments. Thus, in this example, as a result of the touch input 3 being additionally received via the third segment C, the content specified in segment B may be expanded across all three segments, A, B, and C.

Other forms and combinations of touch inputs may invoke other operations, in addition to the expand operation described above. Turning to FIG. 7, for example, a collapse operation may be invoked across two or more segments presenting an expanded application via their respective displays to reverse the expand operation. In a collapse operation, the first touch input 1 may specify the segment to which the expanded operation will be collapsed (segment A in the depicted embodiment), while the second touch input 2 may specify the segment from which the application is to be removed (segment B in the example illustrated). In cases such as that shown in FIGS. 6 and 6A, where the application was expanded across more than two segments, collapsing the first and second segments of the application may have different semantics than collapsing the second and third segments. For example, referring to FIG. 6A, where segment A presents textual content, segment B presents other textual content, and segment C presents icons, collapsing segment A and segment B may result in the presentation of one segment presenting textual information and another segment presenting the icon information. Collapsing segment B and segment C, however, may result in a modified presentation, in which the textual content formerly presented in segment A would continue to be presented in that segment, and the textual content and the icon content of segments B and C, respectively, would be presented together (e.g., in segment B) in combined form.

Yet another operation that may be supported by one or more of the segments may be a swap operation, in which the applications on two segments can be exchanged (e.g., each application being presented on the display of the other segment). In this case, touch inputs may be received via the touch displays 30 of at least first and second segments of the multi-segment wearable accessory 10, and the determination may be made by the touchscreen interface 32, the processor 22 or the like that the touch inputs represent a rotational gesture. Information that is presented upon the display of the first segment prior to the rotational gesture may then be caused to be presented upon the display of the second segment following the rotational gesture, and information that is presented upon the second segment prior to the rotational gesture may be caused to be presented upon the first segment following the rotational gesture. The touch inputs involved in a swap operation as described above are illustrated in FIG. 8, and the result of a swap operation is shown in FIG. 8A.

With reference to FIG. 9, rather than apply the expand operation described above sequentially to expand an application to multiple segments (e.g., by expanding from segment A to segment B, then from segment B to segment C, etc.), an application may be expanded directly to all available segments using three touch inputs that are applied substantially simultaneously. As shown in FIG. 9, a first touch input 1 may be received by a first segment (segment B); a second touch input 2 may be received by a second segment (segment A); and a third touch input 3 may be received by a third segment (segment C), in the manner of a chord. The first touch input 1 may specify the application or content that the user wishes to expand to all of the segments, whereas the second and third inputs 2, 3 may specify adjacent segments (e.g., one immediately above and one immediately below the designated content to be expanded) to which the content is to be expanded. When one of the touch inputs is subsequently removed, the expand all operation may be executed across all of the segments, including segments not involved in receiving any of the three touch inputs.

In cases in which the application requires fewer screens than there are segments available, the application may expand to its maximum state, and the remaining segments may show their original content. In other cases, in which the application has more screens than there are segments available, the application may expand to fill all available segments, with the remaining segments becoming virtual segments that are accessed in other ways, as described below.

The expand all operation may be pre-configured to have a set duration, such that the expanded application collapses to its original segment after the passage of a predetermined amount of time. In some cases, however, one or more segments may be collapsed by using a sequence of rapid back and forth wrist rotations, similar to the shaking action a user may make when attempting to re-seat a watch on his wrist. In this regard, wrist angle data in the form of pose information as described above may be used, in addition to accelerometer data indicating a rapid sequence of positive and negative changes in the angle of the segments with respect to the Y-axis. Furthermore, the collapse all operation may only be configured to be executed if the back and forth wrist rotations described above occur when the user's arm is approximately horizontal (e.g., within 30° of being horizontal).

As noted above, in some embodiments, each screen presented on or capable of being presented on the display of a segment may be considered a virtual segment, and the number of virtual segments may be greater than the number of physical segments that are available to display the virtual segments. In this case, one or more of the virtual segments may be maintained on or associated with one or more of the segments in an overlaid configuration, such that, for example, a topmost virtual segment is displayed for viewing while another virtual segment lies below the topmost virtual segment, hidden from the user's view.

Accordingly, information may thus be displayed upon a plurality of segments of the multi-segment wearable accessory 10, and in response to rotation of the multi-segment wearable accessory 10 about the user's wrist 50 (FIG. 3), such as detected by a touch sensor as described above, the information displayed upon a respective segment may be caused to change. For example, the information displayed upon a segment, representing a virtual segment, may be sequentially associated with each segment of the multi-segment wearable accessory in response to rotation of the multi-segment wearable accessory.

Referring to FIGS. 10A and 10B, for example, nine virtual segments (V1-V9) may be provided, whereas the wearable accessory 10 of the illustrated example only has six physical segments (A-F). Segments A-F in this example would thus be displaying virtual segments V1-V6, with V7 being associated with segment A, but unseen (e.g., hidden behind V1), V8 being associated with segment B, and V9 being associated with segment C. In this case, to view virtual segments that are hidden or otherwise obscured behind other, visible virtual segments (such as V7-V9), the user may rotate the wearable accessory 10 from the position shown in FIG. 10A to the position shown in FIG. 10B, which would serve to sequentially shift which of the virtual segments are visible to the user. As a result, virtual segment V7 would now be visible on physical segment A, while formerly visible virtual segment V1 would now be hidden behind virtual segment V7. Further rotation in the same manner would thus expose virtual segment V8, while removing virtual segment V2 from view, and so on, such that the user may cycle through all the virtual segments by rotating the wearable accessory about the Y-axis. In some embodiments, a user may be able to rotate the wearable accessory continually, and with each rotation the user would view new content. This may be used, for example, to view long textual content (e.g., a lengthy e-mail message) or may be used for interaction widgets that may rely on the continuous circular nature of the particular depicted wearable accessory 10.

Thus, in some embodiments, an apparatus may be provided that includes at least one processor and at least one memory including computer program code. With continued reference to FIGS. 10A-10C, the at least one memory and the computer program code may be configured to, with the processor, cause the apparatus to at least associate first content with a segment of a multi-segment wearable accessory and to associate second content with the same segment. Each of the first and second content would thus represent a virtual segment. In other words, in the depicted embodiment of FIGS. 10A-10C, virtual segment V1 may represent first content that is associated with segment A, and virtual segment V7 may represent second content that is associated with segment A. Likewise, V2 and V8 may represent first and second content, respectively, that is associated with segment B, and so on.

The apparatus may be caused (e.g., via the processor, the at least one memory, and the computer program code) to cause one of the virtual segments to be presented on a display of the segment. In FIG. 10A, for example, where the first-listed virtual segment (top to bottom) is the virtual segment that is presented on the display as noted above, virtual segment V1 is presented on the display of segment A, virtual segment V2 is presented on the display of segment B, etc. The at least one memory and the computer program code may be configured to, with the processor, cause the apparatus to, in response to rotation of the multi-segment wearable accessory, determine whether to replace the virtual segment being presented with presentation of the other virtual segment (e.g., another associated virtual segment). In the case of segment A in FIG. 10A, for example, a determination may be made as to whether virtual segment V1 should be replaced by presenting virtual segment V7 in its place.

As noted above, in some embodiments, one of the segments may be considered a master segment and, as such, may control the operations and interactions of the other segments, which would be considered slave segments. In such a centralized scenario, the master segment may receive notifications or indications (e.g., signals) from other segments, may process these indications, and may in turn send out commands to the slave segments directing that the slave segments perform certain functions. Thus, in an instance in which the master segment is a segment other than segment A in the depicted embodiment and the apparatus is embodied by the master segment, the master segment may associate first content (represented by virtual segment V1) and second content (represented by virtual segment V7) with segment A by transmitting such content to segment A or otherwise instructing segment A regarding the association. The master segment may further transmit signals to segment A instructing segment A to present one or the other of the virtual segments on its display. In FIG. 10A, for example, the master segment may instruct segment A to present virtual segment V1 on its display. The master segment may further determine whether to replace the virtual segment being presented (virtual segment V1 in FIG. 10A) with the other virtual segment (virtual segment V7, as shown in FIG. 10B) in response to detecting rotation of the accessory (from the pose shown in FIG. 10A to that shown in FIG. 10B) and may transmit signals to segment A instructing the replacement if so determined.

In an instance in which the master segment is a segment other than segment A, as described above, but the apparatus is embodied by segment A (the slave segment), segment A may associate first content and second content, each representing virtual segments, with segment A and may further cause one of the virtual segments (e.g., virtual segment V1 in FIG. 10A) to be presented on its display upon receiving the instruction to do so from the master segment. Segment A may further determine whether to replace the virtual segment being presented (virtual segment V1 in FIG. 10A) with the other virtual segment (virtual segment V7) by receiving the instruction to do so (e.g., receiving signals) from the master segment.

Alternatively, as also noted above, control of the operations of the plurality of segments 14 of a multi-segment wearable accessory 10 may be distributed with each or at least a plurality of the segments of the multi-segment wearable accessory controlling at least some of the operations. Under a distributed scenario, each segment of the wearable accessory may multicast events to the other segments, and each segment may thus respond accordingly. In other words, each segment may associate one or more virtual segments with itself and may cause one of the virtual segments to be presented on its display. Each segment may further determine whether to replace the virtual segment it is currently presenting with presentation of the other associated virtual segment in response to rotation of the multi-segment wearable accessory, as described below. In this regard, each segment may multicast its respective orientation, association, and/or the virtual segments being presented to the other segments, such that each segment is aware of the content being presented via other segments and the replacement of content being presented on any given segment can be coordinated.

Regardless of which scenario is employed (centralized or distributed) or in which segment or segments the apparatus is embodied, the at least one memory and the computer program code may be further configured to, with the processor, cause the apparatus to determine whether to replace the virtual segment being presented with the presentation of the other associated virtual segment based at least partially on a location of the display of the segment with respect to the user's line of sight. For example, the at least one memory and the computer program code may be configured to, with the processor, cause the apparatus to cause the virtual segment being presented to be replaced with the presentation of the other virtual segment in an instance in which the display of the segment is outside the user's line of sight.

In FIG. 10A, for example, segment D is closest to the user's line of sight (represented by the eye 55), and segment A is farthest from the user's line of sight. In practical terms, the user in FIG. 10A has the wearable accessory positioned such that he or she is looking at segment D full-on and may have a partial view of the displays of segments E and C. The user in FIG. 10A may not be able to see the displays of segments F, A, or B, with display segment A being the farthest away. In other words, the user would have to rotate the wearable accessory 10 to a much greater extent (e.g., through a larger angle of rotation) to view the display of segment A as compared to the extent of rotation that would be required to view the displays of any of the other segments. Thus, in this example, the determination may be made to replace the virtual segment V1 being presented on the display of segment A with the other virtual segment V7 in response to rotation of the wearable accessory, as shown in FIG. 10B. In other words, the discontinuity in virtual segments may be located between segments F and A, which are outside the user's line of sight in FIG. 10A.

In some cases, the at least one memory and the computer program code may be further configured to, with the processor, cause the apparatus to detect rotation of the multi-segment wearable accessory via an inertial measurement unit (IMU), such as the IMU 100 shown in FIG. 17 and described above. As such, data obtained from the IMU 100 and its sensors 110, 120, 130 may be used to calculate the relative position of each segment with respect to the user and the user's line of sight.

The apparatus may, in some embodiments, be caused (e.g., via the processor, the at least one memory, and the computer program code) to associate additional virtual segments with additional segments of the multi-segment wearable accessory, such that a total number of virtual segments of the multi-segment wearable accessory is greater than a total number of segments of the multi-segment wearable accessory. For example, in FIGS. 10A-10C, there is a total of 9 virtual segments (V1-V9), as compared to a total of 6 segments (A-F). Each virtual segment being presented on a display of a respective segment may be sequentially replaced with presentation of another virtual segment associated with the respective segment. In other words, only one of the segments (A-F) may switch from presenting the content of one virtual segment to the content of another virtual segment at a time (e.g., in response to each rotation of the accessory), with each rotation resulting in the next adjacent segment changing the virtual segment that it is presenting. Thus, when the user rotates the wearable accessory from the pose shown in FIG. 10A to the pose shown in FIG. 10B, the virtual segment V1 presented on the display of segment A may be replaced with the presentation of virtual segment V7. For a subsequent rotation, shown in FIG. 10C, the virtual segment V2 presented on the display of segment B (as shown in FIGS. 10A and 10B) may be replaced with the presentation of virtual segment V8.

Accordingly, in some embodiments, the at least one memory and the computer program code may be configured to, with the processor, cause the apparatus to present virtual segments such that virtual segments being presented on displays of adjacent segments provide a user with continuous scrolling of content. In other words, the content shown on the display of each segment (or at least some of the adjacent segments) may be related, such that the content "flows" from one segment to an adjacent segment to the next adjacent segment, and so on. This may occur, for example, in the event the user is viewing long textual content (e.g., an e-mail or journal article) that requires multiple displays to present the entire length of the content to the user. In a case as described above with reference to FIG. 10A in which the discontinuity in the presentation of virtual segments is located between segments F and A, the user would always see the correct set of continuous segments (e.g., because the updating of virtual segments is occurring outside the user's line of sight, between segments F and A in this example). To see all of the segments, the user would have to rotate the device more than 360°. In the depicted embodiment, in which there are 9 virtual segments associated with 6 (physical) segments, the user would be required to rotate the wearable accessory through 540° to view all of the virtual segments. By extension, it would be possible for an "infinite" number of virtual segments to be sequentially associated with and/or sequentially presented on the displays of each consecutive segment, with segments continually updating as to which virtual segment is presented on their respective displays, thereby providing continuous scrolling of content. Thus, although the depicted example and description above references 9 virtual segments associated with 6 segments, any number of virtual segments may be associated with the segments, such that, for example, 3, 4, 5, or more virtual segments may be associated with any given segment of the wearable accessory.

In still other embodiments, the at least one memory and the computer program code may, in some embodiments, be configured to, with the processor, further cause the apparatus to, in response to rotation of the multi-segment wearable accessory, determine whether to power down the display of the segment. For example, the pose of the wearable accessory, such as determined via an IMU, may allow certain segments that are not in the user's line of sight to be "powered down" (e.g., by dimming, shutting off, or otherwise reducing the use of their respective displays) to conserve power. For example, by rotating the wearable accessory (e.g., either by rotating the wearable accessory with respect to the user's wrist or rotating the user's wrist itself), the respective display power states of each segment may be adjusted accordingly.

Referring now to FIG. 11, in some embodiments, an angle α between at least two segments 14 (e.g., segment A and segment B) of the multi-segment wearable accessory 10 may be determined, such as by the processor 22 based upon input from the sensor 40, and one or more of the segments may be caused to operate in a manner that is at least partially dependent upon the angle between the at least two segments. For example, as between the configuration depicted in FIG. 11, where the wearable accessory 10 is not being worn, but is instead doubled onto itself and resting on a flat surface, the angle α between segments A, B, and C may be determined to be 0°, whereas the corresponding angle between the same segments in the configuration shown in FIG. 4, for example (worn by the user) may be approximately 60°. Based on this determined angle, segments A, B, and C in FIG. 4 may be configured to have separate functionality, for example each segment being dedicated to a particular application. The same segments when in the configuration of FIG. 11, however, may be caused to exhibit different behavior than in FIG. 4, such as by acting as a single display for one particular application or by presenting date and time information across one or more of the respective displays.

Although the examples and descriptions provided above involve segments 14 that are adaptable, or able to have their respective functionality modified based on their relative position in the wearable accessory and/or communication with other remote devices, in some cases one or more segments may be used in a wearable accessory that are non-adaptable, or not configured to have modified functionality. In such cases, the operations described above regarding interaction or information exchange between adjacent segments may apply between the closest adaptable segments, skipping over any intervening non-adaptable segments. As such, the next closest adaptable segment to a particular segment may be considered its "adjacent" segment in the context of the examples provided above.

In some embodiments, a segment 14 of the wearable accessory 10 may be positioned in a predefined orientation with respect to another device, such as a mobile phone, so as to cause certain information (such as the information displayed on the mobile phone) to be transferred to or shared with the respective segment. For example, the orientation sensing techniques described above may be used to detect that the other device (e.g., the mobile phone) is aligned with a particular segment (e.g., the touch display of the mobile phone is substantially parallel to the touch display 16 of the particular segment 14). This may occur, for example, when the device is held against or close to a segment 14 of the wearable accessory, such that the orientation of the device matches or at least approximates the orientation of the respective segment.

Once the respective segment 14 is selected in this way, the user may then move the device away from the wearable accessory, while still maintaining the communications link established with that particular segment. Such a link may allow the user to apply touch inputs to the linked segment (or other segments) to transfer or share content presented on the display of the segment to or with the linked device, or vice versa. In still other embodiments, the linked device may be used to configure certain features of the linked segment or the wearable accessory in general.

FIGS. 12-16 illustrate flowcharts of systems, methods, and computer program products according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus implements the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions, and program instruction means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Figure 12:
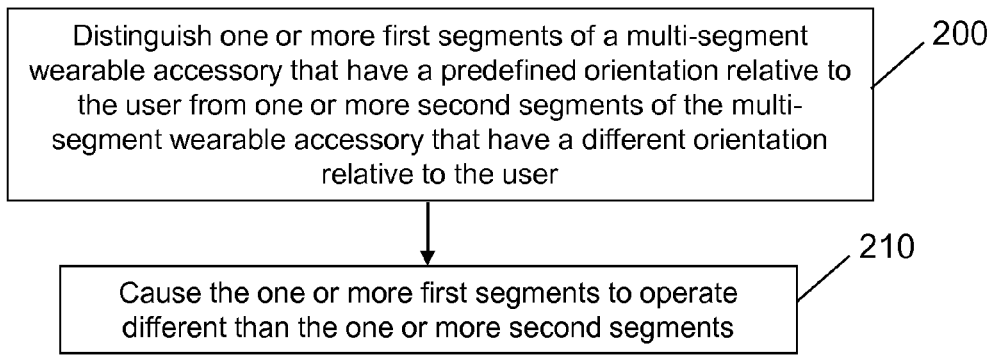

In this regard, one embodiment of a method for providing content on a multi-segment wearable accessory, as shown in FIG. 12, includes distinguishing one or more first segments of a multi-segment wearable accessory that have a predefined orientation relative to the user from one or more second segments of the multi-segment wearable accessory that have a different orientation relative to the user at Block 200. One or more of the first segments may be caused to operate different than the one or more second segments at Block 210, as described above and illustrated in the referenced figures.

Figure 13:
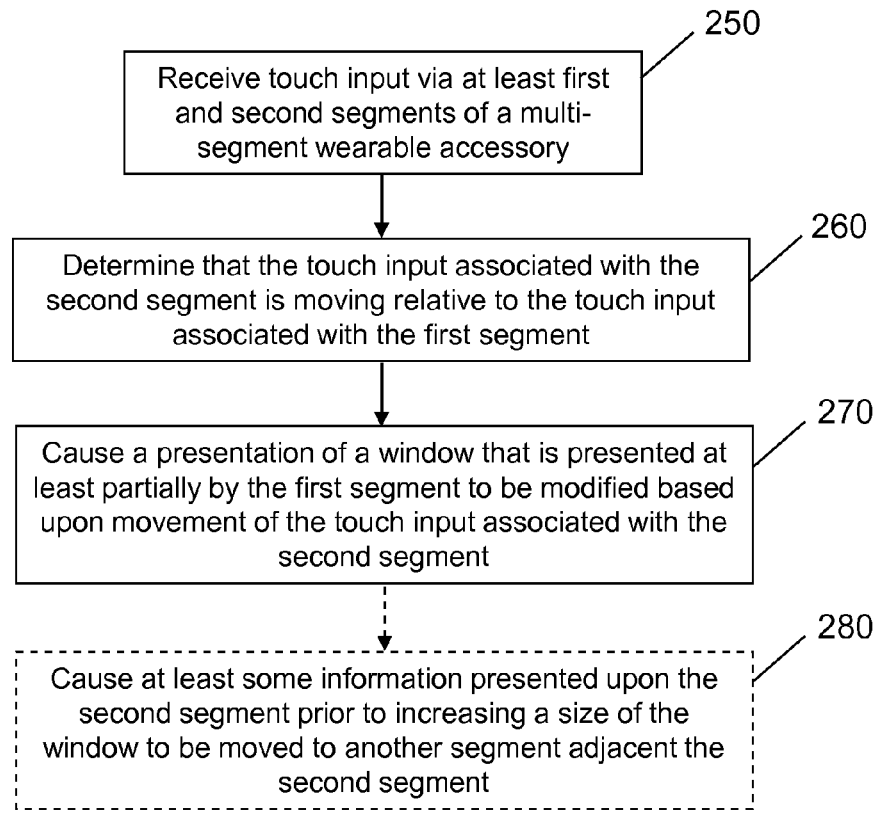

In another embodiment, illustrated in FIG. 13, touch input may be received via at least first and second segments of a multi-segment wearable accessory at Block 250, and a determination may be made that the touch input associated with the second segment is moving relative to the touch input associated with the first segment at Block 260. The method and computer program product may further cause a presentation of a window that is presented at least partially by the first segment to be modified based upon movement of the touch input associated with the second segment at Block 270. In some cases, at least some information presented upon the second segment prior to increasing a size of the window may be caused to be moved to another segment adjacent the second segment at Block 280.

Figure 14:
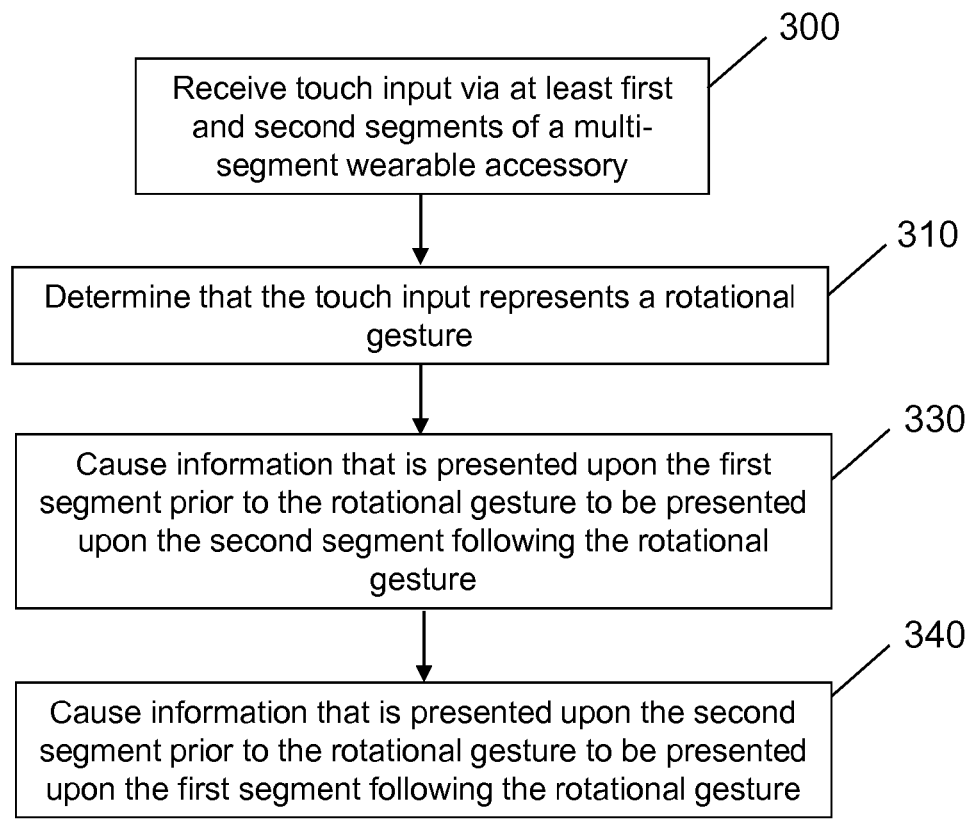

In still other embodiments, depicted in FIG. 14, touch input may be received via at least first and second segments of a multi-segment wearable accessory at Block 300, and a determination may be made that the touch input represents a rotational gesture at Block 310. The method and computer program product may further cause information that is presented upon the first segment prior to the rotational gesture to be presented upon the second segment following the rotational gesture at Block 330 and may further cause information that is presented upon the second segment prior to the rotational gesture to be presented upon the first segment following the rotational gesture at Block 340.

With reference to FIG. 15, in some embodiments, first content and second content may be associated with a segment of a multi-segment wearable accessory at Blocks 400 and 410, with each of the first and second content representing a virtual segment. The method and computer program product may further cause one of the virtual segments to be presented on a display of the segment at Block 420, and, in response to rotation of the multi-segment wearable accessory, a determination may be made as to whether to replace the virtual segment being presented with presentation of the other virtual segment at Block 430.

In some cases, the determination as to whether to replace the virtual segment being presented with the presentation of the other virtual segment may be based at least partially on a location of the display of the segment with respect to a user's line of sight. For example, the virtual segment being presented may be replaced with the presentation of the other virtual segment in an instance in which the display of the segment is outside the user's line of sight. Rotation of the multi-segment wearable accessory may be detected via an inertial measurement unit (IMU) at Block 440.

In some embodiments, additional virtual segments may be associated with additional segments of the multi-segment wearable accessory, such that a total number of virtual segments of the multi-segment wearable accessory is greater than a total number of segments of the multi-segment wearable accessory. Each virtual segment being presented on a display of a respective segment may thus be sequentially replaced with presentation of another virtual segment associated with the respective segment, as described above. Furthermore, virtual segments may be presented such that virtual segments being presented on displays of adjacent segments provide a user with continuous scrolling of content. In some cases, in response to rotation of the multi-segment wearable accessory, a determination may be made as to whether to power down the display of the segment at Block 445.

Referring to FIG. 16, in still other embodiments, an angle between at least two segments of a multi-segment wearable accessory may be determined, as described above, at Block 450. One or more of the segments may then be caused to operate in a manner that is at least partially dependent upon the angle between the at least two segments at Block 460.

In some embodiments, certain ones of the operations above may be modified or further amplified as described below. Furthermore, in some embodiments, additional optional operations may be included, some examples of which are shown in dashed lines in FIG. 13. Modifications, additions, or amplifications to the operations above may be performed in any order and in any combination.

In an example embodiment, an apparatus for performing the methods of FIGS. 12-16 above may comprise a processor (e.g., the processor 22 of FIG. 2) configured to perform some or each of the operations (200-460) described above. The processor may, for example, be configured to perform the operations (200-460) by performing hardware implemented logical functions, executing stored instructions, or executing algorithms for performing each of the operations. Alternatively, the apparatus may comprise means for performing each of the operations described above. In this regard, according to an example embodiment, examples of means for performing at least portions of operations 200, 250, 300, 445, and 450 may comprise, for example, the processor 22, the user interface transceiver 24, the sensor 40, the IMU 100 and/or a device or circuit for executing instructions or executing an algorithm for processing information as described above. Examples of means for performing operations 210, 270, 280, 330, 340, and 460 may comprise, for example, the processor 22, the user interface transceiver 24, and/or a device or circuit for executing instructions or executing an algorithm for processing information as described above. Examples of means for performing operations 400 and 410 may comprise, for example, the processor 22, the communication interface 26, the memory device 28, and/or a device or circuit for executing instructions or executing an algorithm for processing information as described above. Examples of means for performing operation 440 may comprise, for example, the processor 22, the communication interface 26, the IMU 100, and/or a device or circuit for executing instructions or executing an algorithm for processing information as described above. Examples of means for performing operation 420 may comprise, for example, the processor 22, the user interface transceiver 24, the communication interface 26, and/or a device or circuit for executing instructions or executing an algorithm for processing information as described above. Examples of means for performing operations 260, 310, and 430 may comprise, for example, the processor 22, the memory device 28, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. For example, although the description and figures provide examples of embodiments in which each segment 14 is removable from the frame 12 of the wearable accessory 10, in other embodiments one or more of the segments may be integral to or permanently affixed to the frame, such that those segments are not removable. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus to at least:
   associate a first virtual segment with a physical segment of a multi-segment wearable accessory, wherein the multi-segment wearable accessory comprises a plurality of links connected to one another and the physical segment is one of a plurality of physical segments supported by the links, and wherein the first virtual segment is an arrangement of first content configured to be presented on a display of the physical segment;
   associate a second virtual segment with the same physical segment of the multi-segment wearable accessory that is associated with the first virtual segment, wherein the second virtual segment is an arrangement of second content configured to be presented on the display of the physical segment, wherein the display of the physical segment is configured to present only one of the first or second virtual segments at a given time, such that the first and second virtual segments are alternately presentable on the display of the same physical segment;
   cause only one of the virtual segments to be presented on the display of the physical segment, such that the other virtual segment is unpresented; and
   in response to rotation of the multi-segment wearable accessory, determine whether to replace the virtual segment being presented with presentation of the other virtual segment, such that the virtual segment that was previously presented on the display of the physical segment becomes unpresented and the other virtual segment that was unpresented becomes presented to allow a user to view a total number of virtual segments that is greater than a total number of physical segments of the multi-segment wearable accessory.

2. The apparatus of claim 1, wherein the at least one memory and the computer program code are configured to, with the processor, cause the apparatus to determine whether to replace the virtual segment being presented with the presentation of the other virtual segment based at least partially on a location of the display of the physical segment with respect to a user's line of sight.

3. The apparatus of claim 2, wherein the at least one memory and the computer program code are configured to, with the processor, cause the apparatus to cause the virtual segment being presented to be replaced with the presentation of the other virtual segment in an instance in which the display of the physical segment is outside the user's line of sight with respect to displays of other physical segments of the multi-segment wearable accessory.

4. The apparatus of claim 1, wherein the at least one memory and the computer program code are configured to, with the processor, cause the apparatus to detect rotation of the multi-segment wearable accessory via an inertial measurement unit (IMU).

5. The apparatus of claim 1, wherein the at least one memory and the computer program code are configured to, with the processor, cause the apparatus to associate additional virtual segments with additional physical segments of the multi-segment wearable accessory, such that each virtual segment being presented on a display of a respective physical segment is sequentially replaced with presentation of another virtual segment associated with the same respective physical segment.

6. The apparatus of claim 5, wherein the at least one memory and the computer program code are configured to, with the processor, cause the apparatus to present virtual segments such that virtual segments being presented on displays of adjacent physical segments provide a user with continuous scrolling of content.

7. The apparatus of claim 1, wherein the at least one memory and the computer program code are configured to, with the processor, further cause the apparatus to, in response to rotation of the multi-segment wearable accessory, determine whether to power down the display of the physical segment.

8. A method comprising:
   associating a first virtual segment with a physical segment of a multi-segment wearable accessory, wherein the multi-segment wearable accessory comprises a plurality of links connected to one another and the physical segment is one of a plurality of physical segments supported by the links, and wherein the first virtual segment is an arrangement of first content configured to be presented on a display of the physical segment;
   associating a second virtual segment with the same physical segment of the multi-segment wearable accessory that is associated with the first virtual segment, wherein the second virtual segment is an arrangement of second content configured to be presented on the display of the physical segment, wherein the display of the physical segment is configured to present only one of the first or second virtual segments at a given time, such that the first and second virtual segments are alternately presentable on the display of the same physical segment;
   causing only one of the virtual segments to be presented on the display of the physical segment, such that the other virtual segment is unpresented; and
   in response to rotation of the multi-segment wearable accessory, determining whether to replace the virtual segment being presented with presentation of the other virtual segment, such that the virtual segment that was previously presented on the display of the physical segment becomes unpresented and the other virtual segment that was unpresented becomes presented to allow a user to view a total number of virtual segments that is greater than a total number of physical segments of the multi-segment wearable accessory.

9. The method of claim 8, wherein determining whether to replace the virtual segment being presented with the presentation of the other virtual segment is based at least partially on a location of the display of the physical segment with respect to a user's line of sight.

10. The method of claim 9, wherein causing the virtual segment being presented to be replaced with the presentation of the other virtual segment occurs in an instance in which the display of the physical segment is outside the user's line of sight with respect to displays of other physical segments of the multi-segment wearable accessory.

11. The method of claim 8 further comprising associating additional virtual segments with additional physical segments of the multi-segment wearable accessory, such that each virtual segment being presented on a display of a respective physical segment is sequentially replaced with presentation of another virtual segment associated with the same respective physical segment.

12. The method of claim 11, wherein virtual segments being presented on displays of adjacent physical segments provide a user with continuous scrolling of content.

13. The method of claim 8 further comprising, in response to rotation of the multi-segment wearable accessory, determining whether to power down the display of the physical segment.

14. A computer program product comprising at least one non-transitory computer-readable storage medium having computer-executable program code portions stored therein, the computer-executable program code portions comprising program code instructions for:

associating a first virtual segment with a physical segment of a multi-segment wearable accessory, wherein the multi-segment wearable accessory comprises a plurality of links connected to one another and the physical segment is one of a plurality of physical segments supported by the links, and wherein the first virtual segment is an arrangement of first content configured to be presented on a display of the physical segment;

associating a second virtual segment with the same physical segment of the multi-segment wearable accessory that is associated with the first virtual segment, wherein the second virtual segment is an arrangement of second content configured to be presented on the display of the physical segment, wherein the display of the physical segment is configured to present only one of the first or second associated virtual segments at a given time, such that the first and second associated virtual segments are alternately presentable on the display of the same physcal segment;

causing only one of the associated virtual segments to be presented on the display of the physical segment, such that the other associated virtual segment is unpresented; and in response to rotation of the multi-segment wearable accessory, determining whether to replace the associated virtual segment being presented with presentation of the other associated virtual segment, such that the associated virtual segment that was previously presented on the display of the physical segment becomes unpresented and the other associated virtual segment that was unpresented becomes presented to allow a user to view a total number of virtual segments that is greater than a total number of physical segments of the multi-segment wearable accessory.

15. The computer program product of claim 14, wherein determining whether to replace the virtual segment being presented with the presentation of the other virtual segment is based at least partially on a location of the display of the physical segment with respect to a user's line of sight.

16. The computer program product of claim 15, wherein causing the virtual segment being presented to be replaced with the presentation of the other virtual segment occurs in an instance in which the display of the physical segment is outside the user's line of sight with respect to displays of other physical segments of the multi-segment wearable accessory.

17. The computer program product of claim 14, wherein the program code instructions are further configured for detecting rotation of the multi-segment wearable accessory via an inertial measurement unit (IMU).

18. The computer program product of claim 14, wherein the program code instructions are further configured for associating additional virtual segments with additional physical segments of the multi-segment wearable accessory, such that each virtual segment being presented on a display of a respective physical segment is sequentially replaced with presentation of another virtual segment associated with the same respective physical segment.

19. The computer program product of claim 18, wherein virtual segments being presented on displays of adjacent physical segments provide a user with continuous scrolling of content.

20. The computer program product of claim 14, wherein the program code instructions are further configured for, in response to rotation of the multi-segment wearable accessory, determining whether to power down the display of the physical segment.

* * * * *

UNITED STATES PATENT AND TRADEMARK OFFICE
CERTIFICATE OF CORRECTION

PATENT NO. : 9,696,690 B2
APPLICATION NO. : 13/589830
DATED : July 4, 2017
INVENTOR(S) : Nguyen et al.

Page 1 of 1

It is certified that error appears in the above-identified patent and that said Letters Patent is hereby corrected as shown below:

In the Claims

Column 27,
Line 41, "physcal" should read --physical--.

Signed and Sealed this
Twentieth Day of March, 2018

Andrei Iancu
*Director of the United States Patent and Trademark Office*